United States Patent [19]

Casper et al.

[11] Patent Number: 5,526,484
[45] Date of Patent: Jun. 11, 1996

[54] METHOD AND SYSTEM FOR PIPELINING THE PROCESSING OF CHANNEL COMMAND WORDS

[75] Inventors: Daniel F. Casper, Poughkeepsie; John A. deVeer, Millbrook; Edward Loizides, Poughkeepsie, all of N.Y.; Martin W. Sachs, Westport, Conn.; John H. Sorg, Jr., Los Gatos, Calif.

[73] Assignee: International Business Machines Corporation, Armonk, N.Y.

[21] Appl. No.: 988,549

[22] Filed: Dec. 10, 1992

[51] Int. Cl.[6] .................................................. G06F 13/12
[52] U.S. Cl. ............................ 395/200.14; 364/240.8; 364/240.9; 364/251.5; 364/DIG. 1; 395/825
[58] Field of Search .................................. 395/275, 800, 395/200, 275, 200.14, 825, 844

[56] References Cited

U.S. PATENT DOCUMENTS

| | | | |
|---|---|---|---|
| 3,488,633 | 1/1970 | King | 340/172.5 |
| 3,688,274 | 8/1972 | Cormier | 395/425 |
| 4,296,492 | 10/1981 | Hafer | 370/14 |
| 4,866,609 | 9/1989 | Calta | 395/250 |
| 5,060,142 | 10/1991 | Menon et al. | 364/200 |
| 5,182,800 | 1/1993 | Farrell | 395/425 |

OTHER PUBLICATIONS

McHenry, L. E.; "Reading Sequential or Non-Sequential DASD Tracks on Consecutive Revolutions," IBM Technical Disclosure Bulletin; vol. 24, No. 1A, pp. 203–204 (Jun. 1981).

Bishop, J. W.; Fiedler, T. S.; LaViola, W. C. and Moyer, J. T.; "Synchronizing Storage Request Buffer," IBM Technical Disclosure Bulletin; vol. 32, No. 5B, pp. 191–193 (Oct. 1989).

"IBM System/390 Principles of Operation," Form No. SA22-7201-00, Chapters 13–16, pp. 13-1–16-39.

"Enterprise Systems Architecture/390 ESCON I/O Interface", Form No. SA22-7202-01, Chapters 2, 6 & 7, pp. 2-1–2-13, 6-1–7-31.

"Computer Networks", A. S. Tanenbaum; Chapter 4.4, pp. 223–239. Prentice Hall, 1988.

Primary Examiner—Eric Coleman
Attorney, Agent, or Firm—Floyd A. Gonzalez; Heslin & Rothenberg

[57] ABSTRACT

A method and system for pipelining the processing of channel command words is provided. The channel is permitted to send commands and data to the control unit for several channel command words associated with a channel program without having to wait for responses from the control unit for prior commands sent. The channel can pipeline several commands to the control unit and the control unit can then process the commands in the order it receives them. The control unit sends responses to the channel for each command it receives acknowledging receipt of the commands.

80 Claims, 10 Drawing Sheets

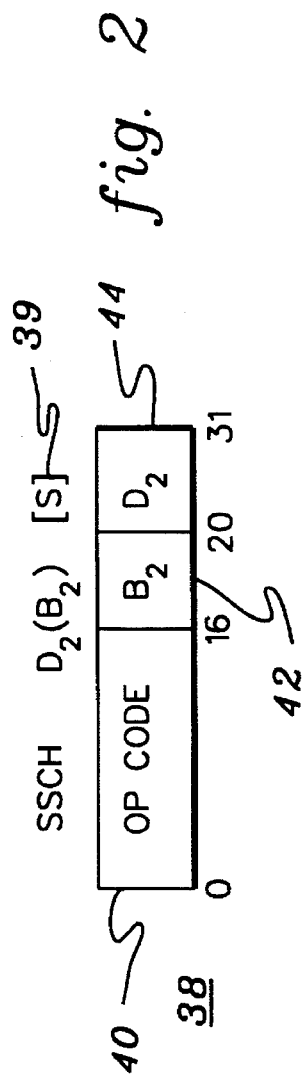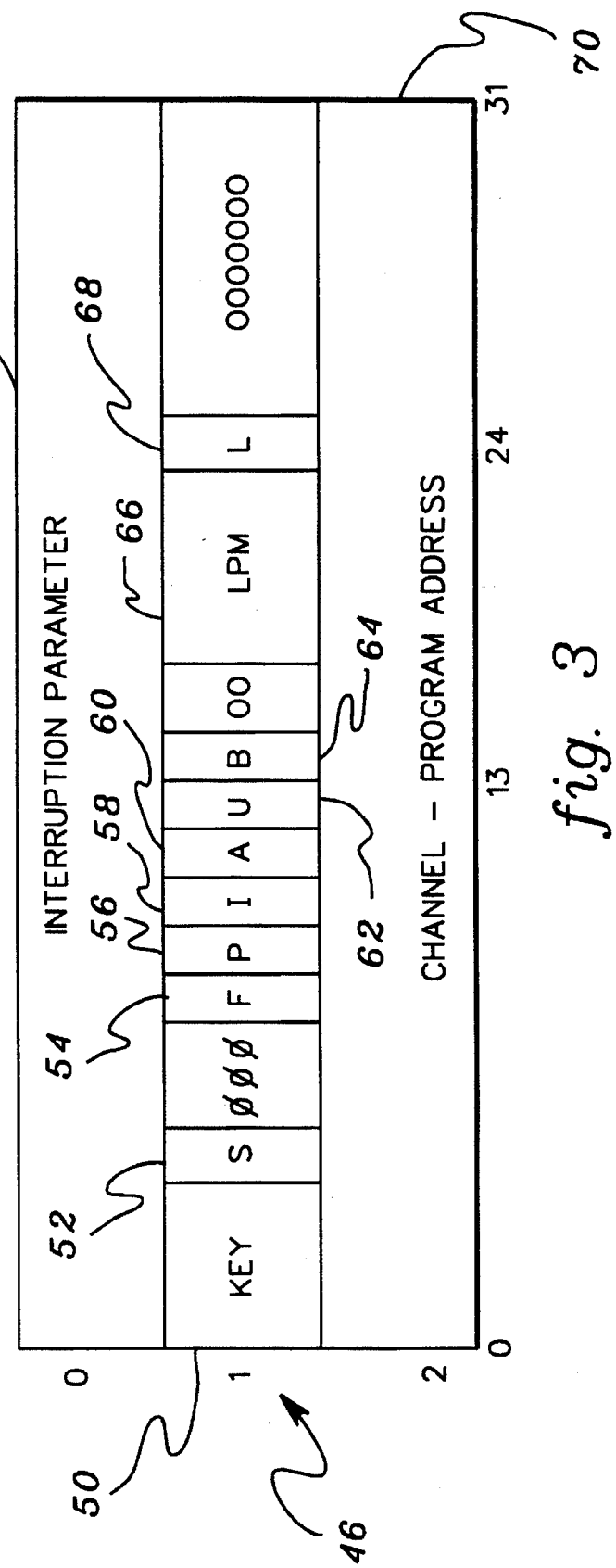

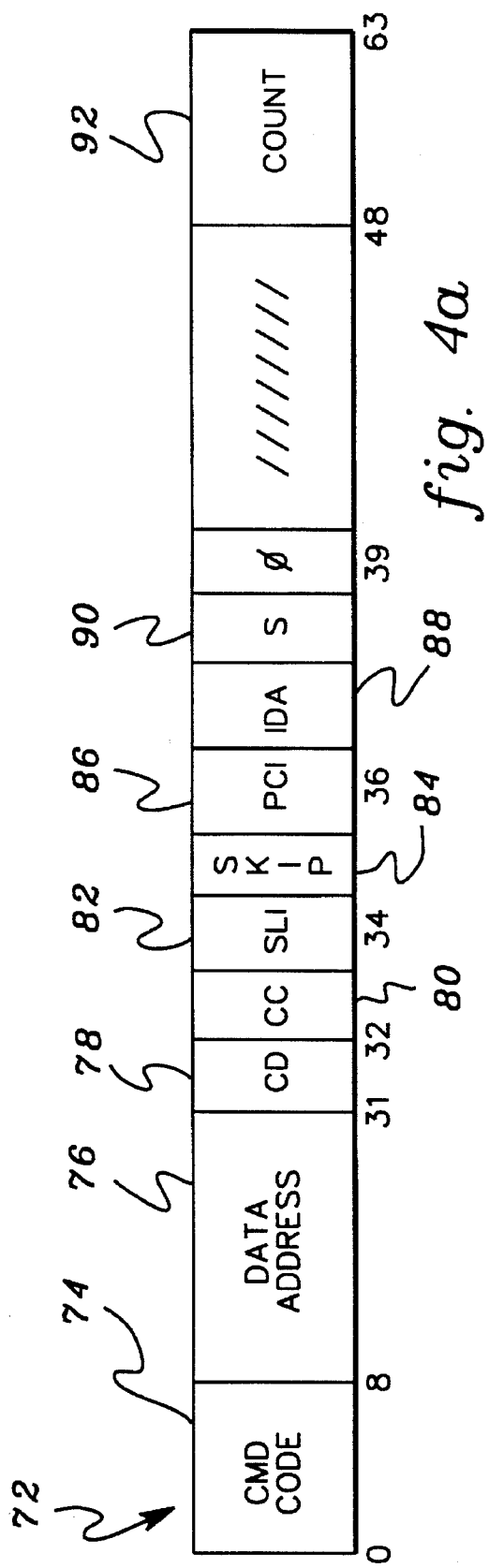
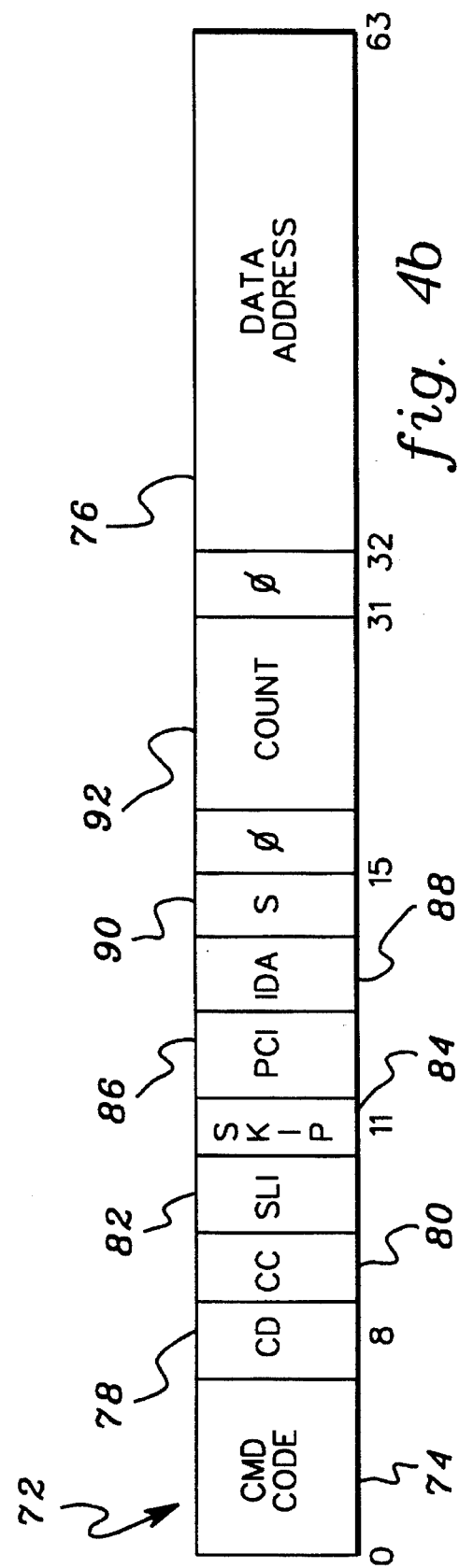
fig. 4a
fig. 4b

METHOD AND SYSTEM FOR PIPELINING THE PROCESSING OF CHANNEL COMMAND WORDS

TECHNICAL FIELD

This invention relates in general to transferring information between a channel and a control unit in a data processing system, and in particular, to pipelining the processing of channel command words.

BACKGROUND ART

In a data processing system architecture, such as International Business Machines Enterprise Systems Architecture/390, information is passed between main storage and input/output devices via a channel subsystem. The channel subsystem uses one or more channel paths, each including a channel and one or more control units and serial links, as the communication links between main storage and the input/output devices. The writing of data from main storage to input/output devices or the reading of data from input/output devices to main storage is accomplished by executing input/output operations. The execution of input/output operations is accomplished by the decoding and executing of channel command words by the channel subsystem and input/output devices. In particular, a chain of input/output operations (channel command words) is initiated when the channel transfers to the control unit the command specified by the first channel command word. Then, during the execution of the specified chain of input/output operations, data and further commands are transferred between the channel and the control unit.

Currently, the processing of each channel command word is completed before processing of the next channel command word begins. That is, a command and any associated data is sent from the channel to the control unit and an appropriate response is received from the control unit before a new command can be sent. Therefore, since the channel and control unit interlock during the initiation and ending of each channel command word, the channel spends unproductive time waiting for signal propagation delays between the channel and the control unit. These delays degrade system throughput and system performance and become more serious as channel data rates and channel to-control-unit distances increase.

Therefore, a need exists for a method and system to mitigate channel-to-control unit round trip delays by permitting the channel to initiate pipelined processing of several channel command words within a channel program without having to wait for responses from the control unit for prior channel command words in the same channel program. There exists a need for the capability to send multiple commands from the channel to the control unit prior to receiving a response from the control unit. A further need exists for a method and system for pipelining the processing of channel command words such that system throughput, response time and link efficiency is improved.

DISCLOSURE OF INVENTION

The shortcomings of the prior art are overcome and additional advantages are provided in accordance with the principles of the present invention through the provision of a method for pipelining the processing of one or more channel command words in a channel program executing in a data processing system. The method includes the steps of verifying a connection between a and a control unit of the data processing system and sending a plurality of commands from the channel to the control unit when pipelining is to occur, as indicated by the verifying step. Each of the plurality of commands are capable of being sent prior to the channel receiving a response to any one of the commands. The method further includes sending a response from the control unit to the channel for each of the plurality of commands received by the control unit.

In one embodiment, the verifying step further includes the steps of sending an initial command retrieved from an initial channel command word from the channel to the control unit and sending an initial response frame corresponding to the initial channel command word from the control unit to the channel.

Further, in one embodiment, the step of sending a plurality of commands includes the step of determining for each command an input/output operation being specified by the command. In one embodiment, the input/output operation is a write or a read operation. During a write operation, the plurality sending step further includes transferring data associated with the command from the channel to the control unit until a predefined condition is satisfied.

In one example, the predefined condition includes having additional data associated with the command to send to the control unit and further having an amount of data in the control unit buffer equal to an amount specified by the control unit buffer size indicator. Also, in one example, the plurality sending step includes having the channel receive from the control unit a control unit buffer available frame indicating to the channel that the control unit has available space to receive at least a portion of the additional data and sending an amount of the additional data from the channel to the control unit when the control unit buffer available frame is received by the channel.

In yet a further embodiment, a read operation is specified and during the read operation, data associated with the command is transferred from the control unit to the channel until a predefined condition is satisfied. In one example, the predefined condition includes having additional data associated with the command to send to the channel and having an amount of data in the channel buffer equal to an amount of data specified by the channel buffer size indicator. Also, in one example, the control unit receives from the channel a channel buffer available frame which indicates that the channel buffer has available space to receive at least a portion of the additional data and an amount of the additional data is sent from the control unit to the channel when the channel buffer available frame is received by the control unit.

In another aspect of the invention, a system for pipelining the processing of one or more channel command words in a channel program executing in a data processing system having a channel coupled to a control unit is provided. The system includes means for verifying a connection between the channel and the control unit, means for sending a plurality of commands from the channel to the control unit when pipelining is to occur as determined by the verifying means, and means for sending a response from the control unit to the channel for each command received by the control unit.

In yet another embodiment of the invention, a method for pipelining the processing of one or more channel command words in a channel program in a data processing system includes sending a first command retrieved from a first channel command word from the channel to the control unit and sending a second command retrieved from a second channel command word from the channel to the control unit prior to the channel receiving a response from the control unit to the first command.

In yet another embodiment of the invention, a method for pipelining the processing of one or more channel command words in a channel program in a data processing system is provided. The data processing system comprises a channel coupled to a control unit. A plurality of commands are sent from the channel to the control unit and a response is sent from the control unit to the channel for each of the plurality of commands received by the control unit. One or more of the responses is sent prior to the control unit receiving a number of commands equal to a command count, thereby allowing commands to be sent from the channel to the control unit while responses are sent from the control unit to the channel without an interruption in processing.

In another embodiment, data is transferred from the channel to the control unit during a write operation specified by one of the plurality of commands. During transferring, one or more buffer available frames are sent from the control unit to the channel thereby allowing data to be sent from the channel to the control unit while buffer available frames are sent from the control unit to the channel without an interruption in processing.

In yet another embodiment, data is transferred from the control unit to the channel during a read operation specified by one of a plurality of commands. During transferring, one or more buffer available frames are sent from the channel to the control unit thereby allowing data to be sent from the control unit to the channel while buffer available frames are sent from the channel to the control unit without an interruption is processing.

In yet another aspect of the invention, a system for pipelining the processing of one or more channel command words in a channel program in a data processing system is provided. The data processing system comprises a channel coupled to a control unit. The system includes means for sending a plurality of commands from the channel to the control unit and means for sending a response from the control unit to the channel for each of the plurality of commands received by the control unit. One or more of the responses is sent prior to the control unit receiving a number of commands equal to a command count, thereby allowing commands to be sent from the channel to the control unit while responses are sent from the control unit to the channel without an interruption in processing.

In another embodiment, means is provided for transferring data from the channel to the control unit during a write operation specified by one of the plurality of commands. During transferring, one or more buffer available frames are sent from the control unit to the channel thereby allowing data to be sent from the channel to the control unit while buffer available frames are sent from the control unit to the channel without an interruption in processing.

In yet another embodiment, means are provided for transferring data from the control unit to the channel during a read operation specified by one of a plurality of commands. During transferring, one or more buffer available frames are sent from the channel to the control unit thereby allowing data to be sent from the control unit to the channel while buffer available frames are sent from the channel to the control unit without an interruption is processing.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

FIG. 2 depicts one embodiment of a format of the START SUBCHANNEL instruction of the present invention;

FIG. 3 depicts one example of the fields associated with an operation request block, in accordance with the principles of the present invention;

FIG. 4a illustrates one example of a format-0 channel command word, in accordance with the principles of the present invention;

FIG. 4b depicts one example of a format-1 channel command word in accordance with the principles of the present invention;

BEST MODE FOR CARRYING OUT THE INVENTION

Figure 1:
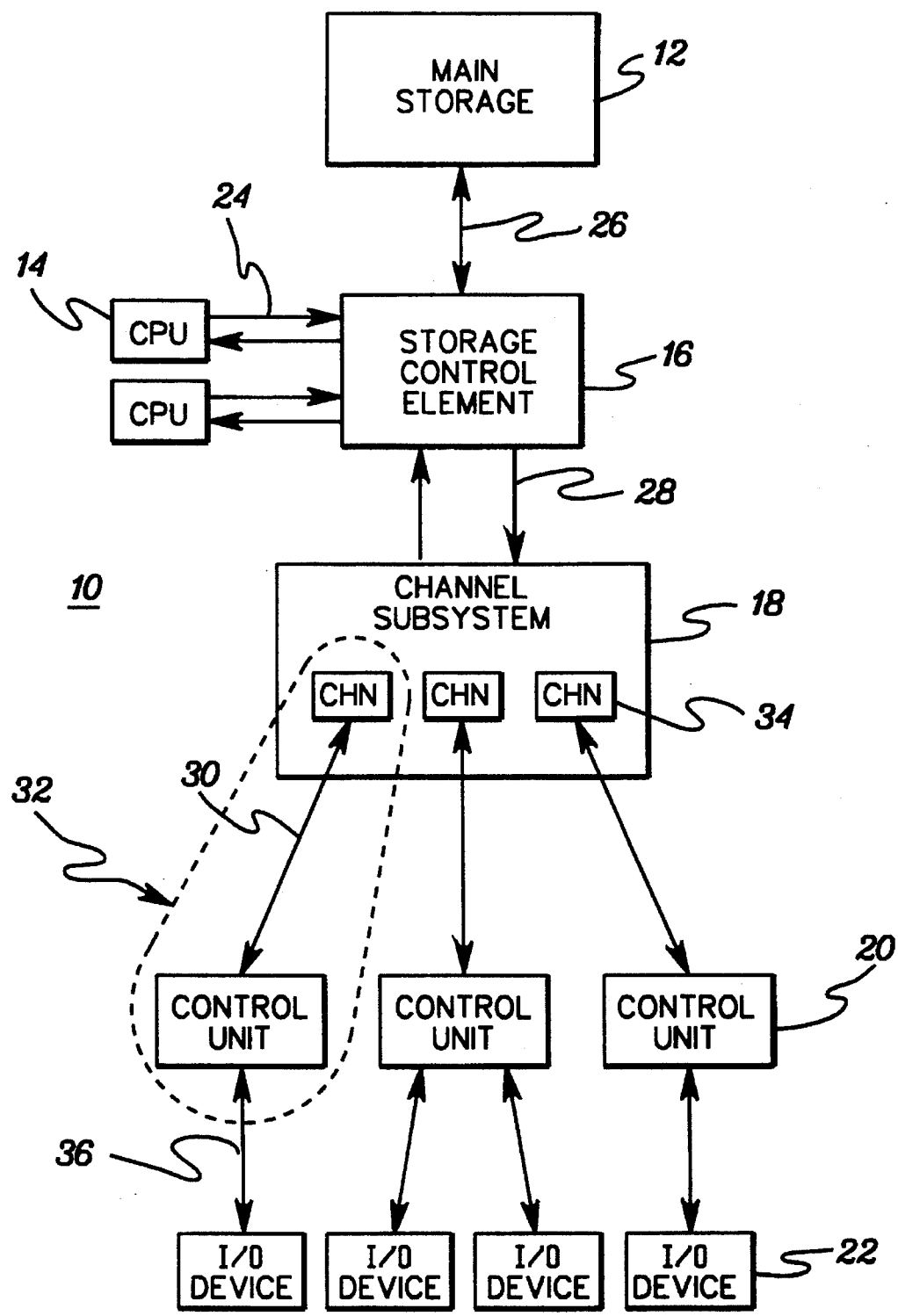
FIG. 1 depicts a block diagram of one example of a data processing system, in accordance with the principles of the present invention.

Depicted in FIG. 1 is one example of a data processing system 10. System 10 includes, for instance, a main storage 12, one or more central processing units (CPU) 14, a storage control element 16, a channel subsystem 18, one or more control units 20 and one or more input/output (I/O) devices 22. Each of these components is explained below.

Main storage 12 stores data and programs which are input from input devices 22. Main storage 12 is directly addressable and provides for high-speed processing of data by central processing units 14 and channel subsystem 18. In one example, main storage 12 includes a customer storage area and a system area (not shown).

Central processing unit 14 is the controlling center of data processing system 10. It contains the sequencing and processing facilities for instruction execution, interruption action, timing functions, initial program loading, and other machine-related functions. Central processing unit 14 is coupled to storage control element 16 via a bidirectional bus or a unidirectional bus 24.

Storage control element 16 is coupled to main storage 12 via a bus 26, central processing units 14 via bus 24 and channel subsystem 18 via a double word bus 28. Storage control element 16 controls, for example, the queuing and the execution of requests made by CPU 14 and channel subsystem 18.

Channel subsystem 18 is coupled to storage control element 16, as described above, and to each of the control units via a serial link 30. Channel subsystem 18 directs the flow of information between input/output devices 22 and main storage 12. It relieves the central processing units of the task of communicating directly with the input/output devices and permits data processing to proceed concurrently with input/output processing. The channel subsystem uses one or more channel paths 32 as the communication links in managing the flow of information to or from input/output devices 22. As a part of the input/output processing, channel subsystem 18 also performs the path-management function of testing for channel path availability, selecting an available channel path and initiating execution of the operation with the input/output device.

Each channel path 32 consists of a channel 34 (channels are located within the channel subsystem, as shown in FIG. 1), one or more control units 20 and one or more serial links 30. (In another example, it is also possible to have one or more dynamic switches as part of the channel path. A dynamic switch is coupled to a channel and a control unit and provides the capability of physically interconnecting any two links that are attached to the switch.)

Also located within channel subsystem 18 are subchannels (not shown). One subchannel is provided for and dedicated to each input/output device accessible to the channel subsystem. A subchannel provides the logical appearance of a device to the program. Each subchannel provides information concerning the associated input/output device 22 and its attachment to channel subsystem 18. The subchannel also provides information concerning input/output operations and other functions involving the associated input/output device. The subchannel is the means by which channel subsystem 18 provides information about associated input/output devices 22 to central processing units 14, which obtain this information by executing input/output instructions. The subchannel consists of internal storage that contains the information in the form of a channel command word (CCW) address, channel path identifier, device number, count, status indications, and input/output interruption subclass code, as well as information on path availability and functions pending or being performed. Input/output operations are initiated with device 22 by executing input/output instructions that designate the subchannel associated with the device.

Channel subsystem 18 is coupled via one or more serial links 30 to one or more control units 20. Each control unit provides the logic to operate and control one or more input/output devices and adapts, through the use of common facilities, the characteristics of each input/output device to the link interface provided by the channel. The common facilities provide for the execution of input/output operations, indications concerning the status of the input/output device and control unit, control of the timing of data transfer over the channel path and certain levels of input/output device control.

Each control unit 20 is attached via a bus 36 to one or more input/output devices 22. In one embodiment, each control unit may be attached to up to 256 input/output devices. Input/output devices 22 receive information or store information in main storage 12. Examples of input/output devices include card readers and punches, magnetic-tape units, direct-access storage, displays, keyboards, printers, teleprocessing devices, communication controllers and sensor-based equipment.

Input/output operations are initiated and controlled by, for instance, a START SUBCHANNEL instruction 38 (FIG. 2) and channel command words, described below. (The START SUBCHANNEL instruction, as well as channels, control units and channel command words associated with International Business Machines Enterprise Systems architecture, are described in detail in "IBM Enterprise Systems Architecture/390 Principles of Operation," Form No. SA22-7201-00, which is hereby incorporated by reference. In addition, communication between channels and control units is described in detail in "Enterprise Systems Architecture/390 ESCON I/O Interface", Form No. SA22-7202-01, which is also incorporated herein by reference.) Forms SA22-7201-00 and SA22-7202-01 describe systems operating in accordance with architectures available from International Business Machines Corp. under the trademarks "Enterprise Systems Architecture/390", "ESA/390" and "ESCON."

START SUBCHANNEL instruction 38 is executed by central processing unit 14 and is part of the central processing unit program that supervises the flow of requests for input/output operations from other programs that manage or process the input/output data. When START SUBCHANNEL instruction 38 is executed, parameters are passed to the target subchannel requesting that channel subsystem 18 perform a start function with the input/output device associated with the subchannel. The channel subsystem performs the start function by using information at the subchannel, including the information passed during the execution of the START SUBCHANNEL instruction, to find an accessible channel path to the device. Once a device is selected, execution of an input/output operation is accomplished by the decoding and executing of a channel command word by channel subsystem 18 and input/output device 22. As described further below, the channel command word specifies the command to be executed and one or more channel command words arranged for sequential execution form a channel program. Both instructions and channel command words are fetched from main storage 12.

Referring to FIG. 2, in one embodiment, START SUBCHANNEL instruction (SSCH) 38 is an 's' format instruction 39 which denotes an operation using an implied operand and main storage 12. START SUBCHANNEL instruction 38 includes an operation code (op code) 40, which specifies the operation to be performed; a first operand ($B_2$) 42, which is an implied operand located in general register 1 (general register 1 contains the subsystem identification word designating the subchannel that is to be started); and a second operand ($D_2$) 44, the address of which is the logical address of an operation request block (ORB) (described below).

The START SUBCHANNEL instruction passes the contents of an operation request block 46 (FIG. 3), the address of which is second operand 44 of the START SUBCHANNEL instruction, to the subchannel. Referring to FIG. 3, in one example, operation request block 46 includes the following fields:

(a) An Interruption Parameter 48: Bits 0–31 of word 0 (operation request block 46 consists of three words, each 31 bits in length) are preserved unmodified in the subchannel until replaced by, for example, a subsequent START SUBCHANNEL instruction. In one instance, these bits are placed in word 1 of the interruption code when an I/O interruption occurs.

(b) A Subchannel Key (KEY) 50: Bits 0–3 of word 1 form the subchannel key for fetching of, for example, channel command words and output data and for storing of input data associated with the start function initiated by START SUBCHANNEL instruction 38.

(c) A Suspend Control (S) 52: Bit 4 of word 1 controls the performance of the suspend function for the channel program identified in operation request block 46. The setting of suspend control 52 applies to all channel command words of the channel program designated by the operation request block. When suspend control 52 is one, suspend control is specified, and a channel program suspension occurs when a valid suspend flag is detected in a channel command word. If suspend control 52 is zero, suspend control is not specified, and the presence of the suspend flag in any channel command word of the channel program causes a program-check condition to be recognized.

(d) A Format Control (F) 54: Bit 8 of word 1 specifies the format of the channel command words which make up the channel program address field. If format control 54 is zero, format-0 channel command words are specified. On the other hand, if format control 54 is one, format-1 channel command words are specified. Format-0 and Format-1 channel command words are described in detail below.

(e) A Prefetch Control (P) 56: Bit 9 of word 1 specifies whether or not unlimited prefetching of channel command words is allowed for the channel program. If prefetch control 56 is equal to zero, no prefetching is allowed, except in the case of data chaining (described below) on output, where the prefetching of one channel command word describing a data area is allowed. If prefetch control 56 is one, unlimited prefetching is allowed.

(f) An Initial-Status Interruption Control (I) 58: Bit 10 of word 1 specifies whether or not channel subsystem 18 is to verify to the program that the device has accepted the first command associated with a start or resume function. If initial-status interruption control 58 is specified as one in operation request block 46, then when initial status is received and the subchannel becomes active, indicating that the first command has been accepted for this start or resume function, the subchannel becomes status-pending with intermediate status.

If the subchannel does not become active, the command-accepted condition is not generated. For example, the subchannel does not become active when device 22 signals channel end immediately upon receiving the first command, command chaining (described below) is not specified in the channel command word, command retry is not signaled.

(g) An Address-Limit-Checking Control (A) 60: Bit 11 of word 1 specifies whether or not address-limit checking is specified for the channel program. If this bit is zero, no address-limit checking is performed for the execution of the channel program, independent of the setting of the limit-mode bits in the subchannel. If address-limit-checking control 60 is one, address limit checking is allowed for the channel program, subject to the setting of the limit-mode bits in the subchannel.

(h) A Suppress-Suspended-Interruption Control (U) 62: Bit 12 of word 1, when one, specifies that channel subsystem 18 is to suppress the generation of an intermediate interruption condition due to suspension if the subchannel becomes suspended. When bit 12 is zero, the channel subsystem generates an intermediate interruption condition whenever the subchannel becomes suspended during execution of the channel program.

(i) A Pipeline Enable Flag (B) 64: In accordance with the principles of the present invention, pipeline enable flag 64 is added to operation request block 46. As one example, bit 13 of word 1 is designated as the pipeline enable flag. Pipeline enable flag 64 indicates whether pipelining of the processing of channel command words of a channel program is to occur. When bit 13 is one, the pipeline operation is specified. On the other hand, when pipeline enable flag 64 is zero, pipelining is prohibited.

In accordance with the principles of the present invention, when pipelining is permitted, a number of commands, each of which is retrieved from an associated channel command word, is capable of being sent from channel 34 to control unit 20 without having the channel receive a response from the control unit. Further, any associated data and controls of each of the commands can be sent prior to receiving a response.

(j) Logical-Path Mask (LPM) 66: Bits 16–23 of word 1 are preserved unmodified in the subchannel and specify to channel subsystem 18 which of the logical paths 0–7 are to be considered logically available, as viewed by the CPU program. Should logical-path mask 66 be set to one, the corresponding channel path is logically available. However, a zero specifies that the corresponding channel path is logically not available.

(k) An Incorrect-Length-Suppression Mode (L) 68: When the incorrect-length-indication-suppression facility is installed and format control 54 is one, then bit 24 of word 1, when one, specifies the incorrect-length-suppression mode. If the subchannel is in this mode when an immediate operation occurs (that is, a device signals a channel-end condition during the initiation sequence) and the current channel command word contains a non-zero value in bits 16–31 (described below), indication of an incorrect-length condition is suppressed.

When the incorrect-length-indication-suppression facility is installed and format control 54 is one, then bit 24 of word 1, when zero, specifies the incorrect-length-indication mode. If the subchannel is in this mode when an immediate operation occurs and the current channel command word contains a non-zero value in bits 16–31, indication of an incorrect-length condition is recognized. Command chaining is suppressed unless a suppress length indication command flag in the channel command word, as described below, is one and the chain-data flag is zero.

When the incorrect-length-indication-suppression facility is installed and format control 54 is zero, the value of bit 24 is ignored by the channel subsystem, and the subchannel is in the incorrect-length-suppression mode.

When the incorrect-length-indication-suppression facility is not installed and incorrect-length-suppression mode 68 is zero, the subchannel is in the incorrect-length-suppression mode. When the incorrect-length-indication-suppression facility is not installed, bit 24 must be zero; otherwise, an operand exception is recognized.

(1) A Channel-Program Address 70: Bits 0–31 of word 2 designate the location of the first channel command word in absolute storage. In one example, bit 0 of word 2 is zero; otherwise, an operand exception or a program-check condition is recognized. If format-0 channel command words have been specified by format control 54, then bits 1–7 are also zeros; otherwise, a program-check condition is recognized.

The three rightmost bits of the channel-program address are zeros, designating the channel command word on a double-word boundary; otherwise, a program-check condition is recognized.

If channel-program address 70 designates a location protected against fetching or designates a location outside the storage of the particular installation, the start function is not initiated at the device. In this situation, the subchannel becomes status-pending with primary, secondary, and alert status.

When the contents of the operation request block have been passed to the subchannel, the execution of the START SUBCHANNEL instruction is complete. Subsequently, channel subsystem 18 fetches the first channel command word designated by channel-program address 70 of operation request block 46 and decodes it according to format control 54 of operation request block 46, as described in further detail below.

Channel command words may have many possible formats. In this example, two formats are used: format-0 and format-1. Format-0 and format-1 channel command words contain the same information, but the fields are arranged differently in the format-1 channel command word so that 31-bit addressing can be specified directly in the channel command word. Examples of format-0 and format-1 channel command words are depicted in FIG. 4a and FIG. 4b, respectively.

In accordance with the principles of the present invention, the fields in a channel command word 72 are defined as follows (like numbers are used for similar fields):

(a) A Command Code 74: Bits 0–7 (both formats) specify to channel subsystem 18 and input/output device 22 the operation to be executed. Examples of valid commands are write, read, read backward, sense and transfer.

(b) A Data Address 76: Bits 8–31 (format-0) or bits 33–63 (format-1) designate a location in absolute storage, which is associated with an input/output operation. Channel command word 72 defines the area associated with the input/output operation by designating the address of the first byte to be transferred and the number of consecutive bytes contained in the area. The address of the location which designates the first byte of data is specified by data address field 76. The number of bytes contained in the storage area is specified in a count field, described below.

(c) A Chain-Data (CD) Flag 78: Bit 32 (format-0) or bit 8 (format-1), when one, specifies chaining of data. It causes the storage area designated by the next channel command word to be used with the current input/output operation. When chain data flag 78 is one in channel command word 72, the chain-command and suppress-length-indication flags (see below) are ignored.

(d) A Chain-Command (CC) Flag 80: Bit 33 (format-0) or bit 9 (format-1), when one, and when chain-data flag 78 and a suspend flag, described below, are both zeros, specifies chaining of commands. It causes the operation specified by command code 74 in the next channel command word to be initiated on normal completion of the current operation.

(e) Suppress-Length-Indication (SLI) Flag 82: Bit 34 (format-0) or bit 10 (format-1) controls whether an incorrect-length condition is to be indicated to the program. When this bit is one and chain-data flag 78 is zero, the incorrect-length indication is suppressed. When both chain-command flag 80 and suppress-length-indicator flag 82 are ones, and chain-data flag 78 is zero, command chaining takes place, regardless of the presence of an incorrect-length indication.

(f) A Skip (SKIP) Flag 84: Bit 35 (format-0) or bit 11 (format-1), when one, specifies the suppression of transfer of information to storage during a read, read-backward, sense ID, or sense operation.

(g) A Program-Controlled-Interruption (PCI) Flag 86: Bit 36 (format-0) or bit 12 (format-1), when one, causes channel subsystem 18 to generate an intermediate interruption condition when, in accordance with the principles of the present invention, the channel receives from the control unit a command response frame, described below, with the same channel command word number as the number the channel assigned to the channel command word containing the program-controlled-interruption flag. When program-controlled-interruption flag 86 is zero, normal operation takes place.

(h) An Indirect-Data-Address (IDA) Flag 88: Bit 37 (format-0) or bit 13 (format-1), when one, specifies indirect data addressing.

(i) A Suspend (S) Flag 90: Bit 38 (format-0) or bit 14 (format-1) when one, specifies suspension of channel program execution. When valid, it causes channel program execution to be suspended prior to execution of the channel command word containing suspend flag 90. The suspend flag is valid when bit 4, word 1 of the associated operation request block 46 is one.

(j) A Count 92: Bits 48–63 (format-0) or bits 16–31 (format-1) specify the number of bytes in the storage area designated by channel command word 72.

In one embodiment, bit 39 (format-0) or bit 15 (format-1) of each channel command word other than a format-0 channel command word specifying transfer in channel is a zero. Additionally, if indirect data addressing is specified, bits 30–31 (format-0) or bits 62–63 (format-1) of channel command word 72 are zeros, designating a word boundary, and bit 0 of the first entry of the indirect-data-address list is also zero. Otherwise, a program-check condition may be generated. Detection of this condition during data chaining causes the input/output device to be signaled to conclude the operation. When the absence of these zeros is detected during command chaining or subsequent to the execution of START SUBCHANNEL instruction 38, the new operation is not initiated, and an interruption condition is generated. The contents of bit positions 40–47 of a format-0 channel command word are ignored. An input/output operation is initiated with an input/output device when channel 34 transfers the command specified by command code 74 from the current channel command word 72 via a command frame to control unit 20 and input/output device 22. A command frame is one type of a device frame (a device frame is used to transfer device-level information or specify device-level functions) and is used for the channel to control unit transfer of the information associated with the current channel command word being executed. At the beginning of an input/output operation, a command frame is used to initiate the operation with an input/output device. When data chaining is performed, a command frame is used to update the information held about the current channel command word at the control unit. With reference to FIGS. 5a–5g one embodiment of a device frame, and in particular, a command frame is described in detail herein.

Figure 5A:
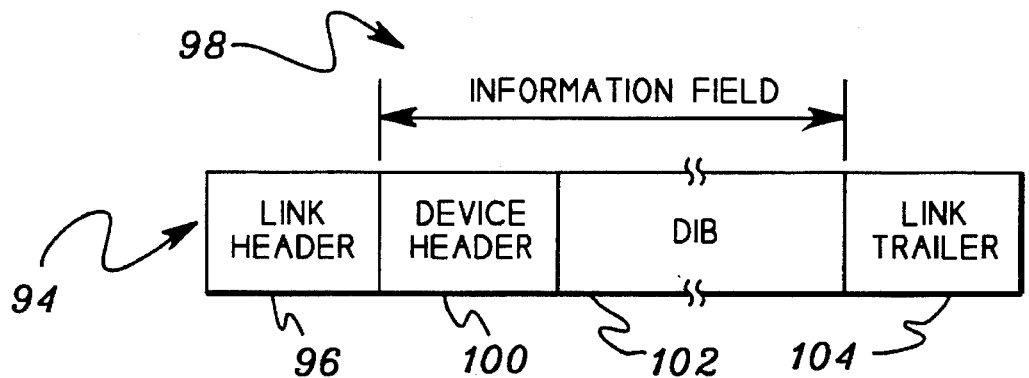
FIG. 5a depicts one example of the fields of a command frame, in accordance with the principles of the present invention.
Figure 5B:
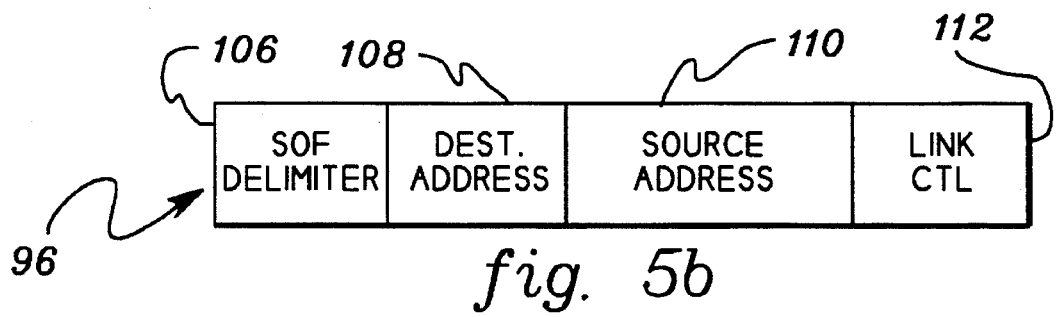
FIG. 5b depicts one embodiment of the fields associated with the link header of the command frame depicted in FIG. 5a, in accordance with the principles of the preset invention.
Figure 5C:
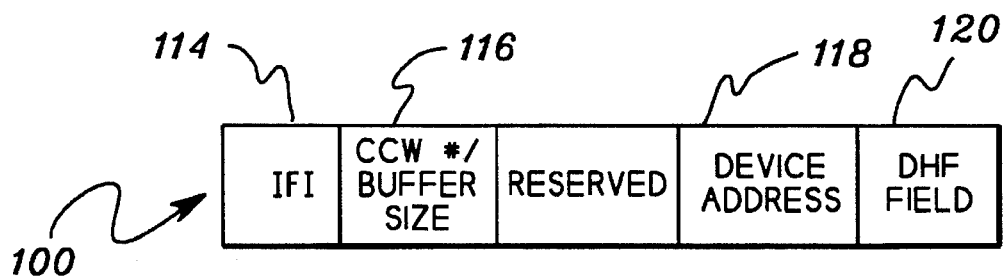
FIG. 5c depicts one example of the fields associated with the device header of the command frame depicted in FIG. 5a, in accordance with the principles of the present invention.

Referring to FIG. 5a one example of a format of a command frame 94 is depicted. Command frame 94 includes, for example, a link header 96; an information field 98 consisting of a device header 100 and a device-information block 102; and a link trailer 104. Each of these fields is described in detail below.

Link header 96 includes the addressing information which is used to determine the physical path on which the frame is to be sent, the logical addressing information which is used to determine the logical paths associated with the physical path, and the link-control information which is used to specify the frame type and format. Link header 96 consists of the following fields (FIG. 5b): a start of frame delimiter 106, which is the first string of characters of a frame; a destination-address field 108, which contains an 8-bit destination link address identifying the link-level facility of a channel or control unit that is the destination for the frame and a 4-bit destination logical address containing the destination logical address; a source-address field 110, which contains an 8-bit source link address identifying the sending link-level facility and a 4-bit source logical address containing the source logical address; and a link-control field 112, which indicates the type and format of the frame.

Referring again to FIG. 5a, information field 98 is used for the transfer of commands, status, data and control. As previously stated, it includes device header 100 and device-information block 102. Device header 100 is four bytes in length and includes a 1-byte information field identifier (IFI) 114 (FIG. 5c), a channel command word number (CCW#)/buffer size field 116, a 2-byte device address 118 and a 1-byte device header flag (DHF) field 120. Each of these fields is described in detail below.

Figure 5D:
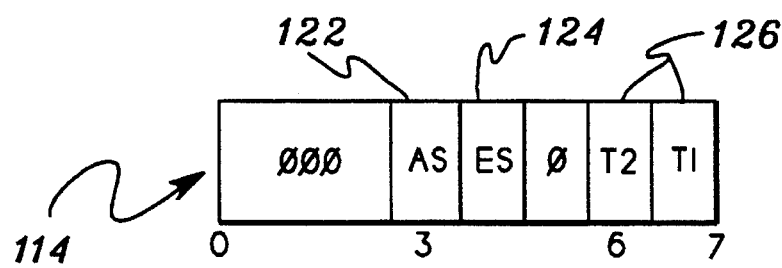
FIG. 5d depicts one example of the fields associated with the information field identifier of the device header depicted in FIG. 5c, in accordance with the principles of the present invention.

Referring to FIG. 5d, information field identifier 114 includes the following fields:

(a) A 1-bit address specific (AS) bit 122 which when set to one indicates that the frame is associated with the specific input/output device identified by device address field 118 of device header 100. When address specific bit 122 is set to zero, the frame is not associated with a specific input/output device, and the device address is not used. Typically, for a command frame, address specific bit 122 is set to one;

(b) A supplemental status (ES) bit 124 which is used to control the transfer of supplemental status. For a command frame, typically, supplemental status bit 124 is set to zero;

(c) A device frame type (T2, T1) 126 which defines the type of device frame. Device frame type 126 also determines the format of the device information block. For example, if T2 and T1 both equal zero, then the device frame type is data and the device information block includes data. However, if T2=0 and T1=1, the device frame type equals command and the device information block includes flags, channel command word command, or count. Further, if T2=1 and T1=0, the device frame type is status and the device information block includes flags, status, count and supplemental status, and should T2 and T1 both equal one, the device frame type is control and the device information block includes control function and parameters.

As previously stated and in accordance with the principles of the present invention, device header 100 also includes a channel command word number/buffer size field 116. In the case of a first command frame of a channel program, this field includes the channel's buffer size, in accordance with the principles of the present invention. This indicates to the control unit the amount of data that can be sent to the channel on read operations before receiving a buffer available frame, as described below, from the channel. For the remaining command frames of a particular channel program, the channel command word number/buffer size field 116 includes the identification of the associated channel command word. The channel command word number starts with zero and increments by one in every new command frame to 255, as an example. The first command frame has an implied channel command word number of zero. Since the command frame in effect assigns the channel command word number to a channel command word, all frames (e.g., command response frames and status frames) have the same channel command word number as was assigned to it in the command frame.

Device header 100 further includes device address which is, for example, 16-bits in length. When address specific bit 122 is set to one, device address identifies the input/output device on the logical path that is to receive the contents of the information field in channel-to-control unit frames or that is to send the contents of the information field in control unit-to-channel frames.

Figure 5E:
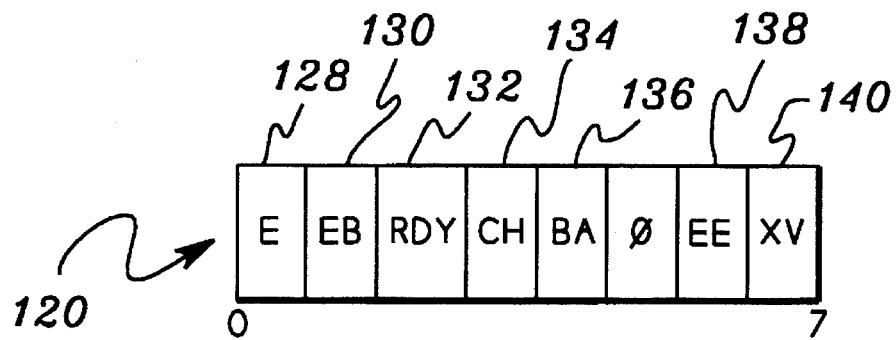
FIG. 5e depicts one example of the fields associated with the device header flag field of the device header depicted in FIG. 5c and in accordance with the principles of the present invention.

In addition to the above, device header flag field 120 of device header 100 consists of a number of device header flag bits which are used individually or collectively to invoke certain device level protocols to control the execution of an input/output operation. One example of the format of device header flag field is depicted in FIG. 5e and is described in detail herein. As one example, device header flag field 120 includes the following fields:

(a) An End (E) Flag 128: In accordance with the principles of the present invention, end Flag 128 indicates to the receiver of data whether or not the transfer count of data, described below, equals the channel command word count, also described below. In a command frame, end flag 128 is ignored.

(b) An End Block (EB) Bit 130: End block bit 130 when set to one (or set active) (as used herein, when referring to setting of bits one is used interchangeably with active and zero is used interchangeably with inactive) is used by the control unit to notify the channel of a disconnection.

(c) A Ready Bit 132: Ready bit 132 when set to one indicates that the operation is considered in progress at the channel or the control unit, the sender of data is ready to transfer data, the sender of data is ready to accept a new data request or the channel granted a requested connection. The meaning of the bit when set to one depends on the type of device frame, whether the frame was sent by the channel or control unit, and the conditions under which the bit is used. For a command frame, the ready bit is set to zero by the channel and is ignored by the control unit.

(d) A Chaining Bit 134: Chaining bit 134 when set to one, is used by the channel to signal its intention to chain or to confirm that chaining is continuing. The chaining bit is set to zero in frames sent by the control unit and is ignored in frames received by the channel. For a command frame from the channel, chaining bit 134 may be set to either one or zero. If the chaining bit is set to one, the command frame is a command update as a result of either command chaining or data chaining, and the command flag field (described below) and the count field contain information from the current channel command word. Additionally, if the chaining bit is set to one and the update is for command chaining, the command field indicates the command from the new channel command word.

(e) A Buffer Available Flag 136: In accordance with the principles of the present invention, buffer available flag 136 is added to device header flag 120. Buffer available flag 136 is used to indicate whether there is an available buffer for sending further data to either the control unit or the channel.

(f) An End Early Flag 138: In accordance with the principles of the present invention, end early flag 138 indicates to the control unit how to proceed when all the data for a channel command word is not sent to the control unit. In one example, end early flag 138 is active when end flag 128 in a control-end frame, described below, is inactive. End early flag 138 is inactive for a command frame.

(g) A Transfer Count Valid (XV) Flag 140: In accordance with the principles of the present invention, transfer count valid flag 140 is included in device header flag field 120. This flag indicates whether or not a transfer count field, described below, of a control end frame contains the amount of data which has been transferred. However, transfer count valid flag 140 is inactive when sent by command frame 94.

Referring back to FIG. 5a, in addition to device header 100, information field 98 of command frame 94 includes device information block 102. In one embodiment and in accordance with the principles of the present invention, device information block 102 includes a command flag field 142 (FIG. 5f), a channel command word command 144 and a channel command word count 146. Each of these fields is described in detail below.

Figure 5F:
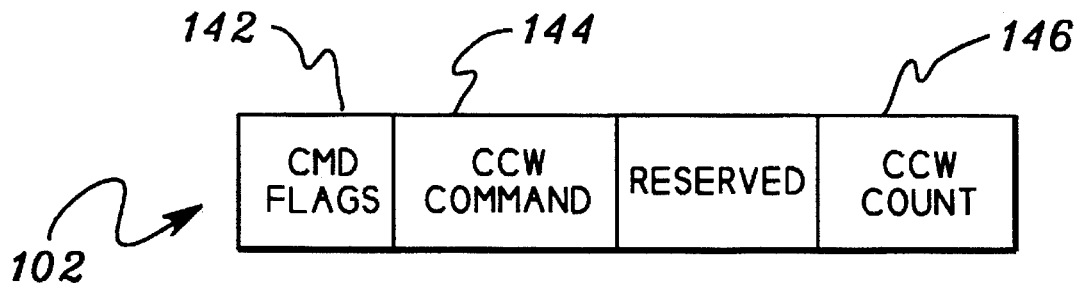
FIG. 5f depicts one example of the fields associated with the device information block of the command frame depicted in FIG. 5a, in accordance with the principles of the present invention.
Figure 5G:
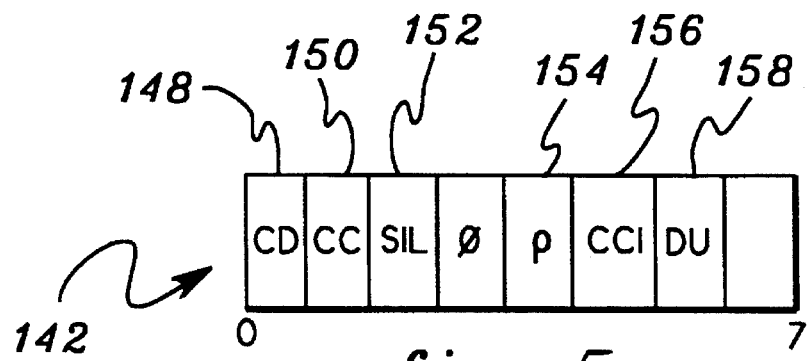
FIG. 5g depicts one example of the fields associated with the command flags of the device information block depicted in FIG. 5f, in accordance with the principles of the present invention.

Referring to FIG. 5g, command flag field 142 includes the following flags:

(a) A Chain Data (CD) Flag 148: Chain data flag 148 (bit 0) when set to one, specifies an intent to perform chaining of data. It causes the command flags and count designated by the next command frame in which a data chaining update flag (described below) and a command chaining flag (also described below) are set to one to be used with the current input/output operation. When chain data flag 148 is set to one, command chaining flag 150 is ignored.

In one embodiment, chain data flag 148 receives its value from chain data flag 78 of channel command word 72.

(b) A Chain Command (CC) Flag 150: When chain command flag 150 (bit 1) is set to one and chain data flag 148 is set to zero, an intent to perform chaining of commands is specified. Upon normal completion of the current input/output operation in the channel, and after receiving a device end from the input/output device, chaining of commands causes a new input/output operation to be initiated. When chain data flag 148 is set to one, chain command flag 150 is ignored.

In one embodiment, chain command flag 150 receives its value from chain command flag 80 of channel command word 72.

(c) A Suppress Incorrect Length Flag (SIL) 152: In accordance with the principles of the present invention, suppress incorrect length flag 152 is added to command flag field 142. Suppress incorrect length flag 152 from each channel command word is sent from the channel to the control unit in the command frame. The control unit uses this flag in making the decision of whether to continue on to the next channel command word on long or short records.

(d) A Pipeline Flag (P) 154: In accordance with the principles of the present invention, pipeline flag 154 is added to command flag field 142. Pipeline flag 154 indicates to the control unit that the following command of a channel command word will be sent to the control unit by the channel without waiting for a response from the control unit to this command.

Typically, in one embodiment, the control unit will not send a status frame (described below) to the channel for any command frame that has pipeline flag 154 active.

In accordance with the principles of the present invention, pipeline flag 154 is set to one when pipeline enable flag 64 in operation request block 46 is active.

(e) A Continue On Command Immediate (CCI) 156: In accordance with the principles of the present invention, continue on command immediate 156 is added to command flag field 142. Continue on command immediate 156 is set by the channel if the channel command word is a format-0 or a format-1 and the subchannel is set up to suppress incorrect length on a command immediate or suppress length indication flag 82 is active in the channel command word. If continue on command immediate 156 is active, the control unit continues on with the next command on a command immediate even if channel command word count 146 is not zero. Should continue on command immediate 156 not be active, the control unit presents the command immediate status to the channel if the channel command word count is not zero. If the command is a command immediate but status is reported to the channel, an end early bit may be set active in the status flags, as described below. This bit tells the channel to set the incorrect length bit in the channel status, but not to report any pending storage exceptions.

(f) A Data Chaining Update (DU) Flag 158: When data chaining update flag 158 is set to one, it indicates that command chaining flag 150, chain data flag 148, and count 146 sent in the command frame are associated with a new channel command word used during data chaining. When data chaining update flag 158 is set to one, chaining bit 134 in device header flag field 120 is set to one.

Referring to FIG. 5f, as previously stated, in addition to command flags 142, device information block 102 also includes a channel command word command 144. Channel command word command 144 contains the command from the current channel command word and specifies the input/output operation to be executed. In one example, the basic operations are specified by the following commands:

(a) Read, which initiates execution of an input/output operation that performs input/output device-to-channel data transfer. The bytes of data within a block are provided in the same sequence as those received by the write command;

(b) Read backward, which initiates execution of an input/output operation in the same manner as the read command, except that bytes of data within a block are sent to the channel in an order which is the reverse of that used in writing. The bits within an 8-bit byte are in the same order as sent to the input/output device on writing;

(c) Write, which initiates execution of an input/output operation that performs channel-to-input/output device data transfer;

(d) Control, which initiates execution of an input/output operation that performs channel to input/output device data transfer. The device interprets data as control information; and (e) Sense, which is similar to a read command, except that the data is obtained from sense indicators rather than from a record source.

The rightmost bit positions of channel command word command 144 indicate the type of operation and the leftmost bit positions indicate a modification code which expands the meaning of the basic command that is to be performed. The modified codes and the commands performed when they are decoded are model dependent.

In addition to the above, device information block 102 further includes channel command word count field 146 which is a 16-bit field that contains the amount of data to be transferred as specified in count field 92 of the current channel command word.

Referring back to FIG. 5a, command frame 94 includes link trailer 104. Link trailer 104 includes a two-byte cyclic-redundancy-check (CRC) field followed by an end-of-frame (EOF) delimiter. The end-of-frame delimiter is the last string of transmission characters of a frame.

In one embodiment, in order to determine that a command sent by channel 34 (FIG. 1) to control unit 20 was received and accepted for execution, a command response frame 162 is sent by control unit 20. One example of a format for command response frame 162 is depicted in FIGS. 6a through 6c and is described in detail herein.

Figure 6A:
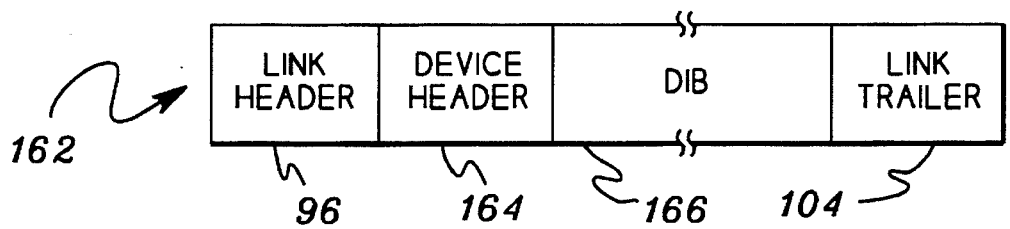
FIG. 6a illustrates one embodiment of a command response frame, in accordance with the principles of the present invention.

Referring to FIG. 6a, similar to command frame 94, command response frame 162 (which is one example of a control transfer frame) includes link header 96 (similar fields are given like reference numbers), a device header 164, a device information block 166 and link trailer 104. The link header and trailer are similar to those of command frame 94, as described above, and therefore are not described at this point.

Figure 6B:
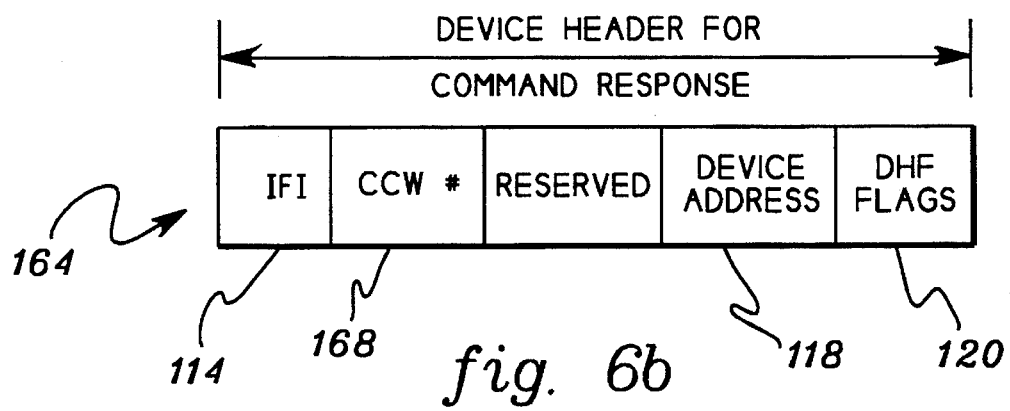
FIG. 6b depicts one example of the fields associated with the device header of the command response frame depicted in FIG. 6a, in accordance with the principles of the present invention.
Figure 6C:
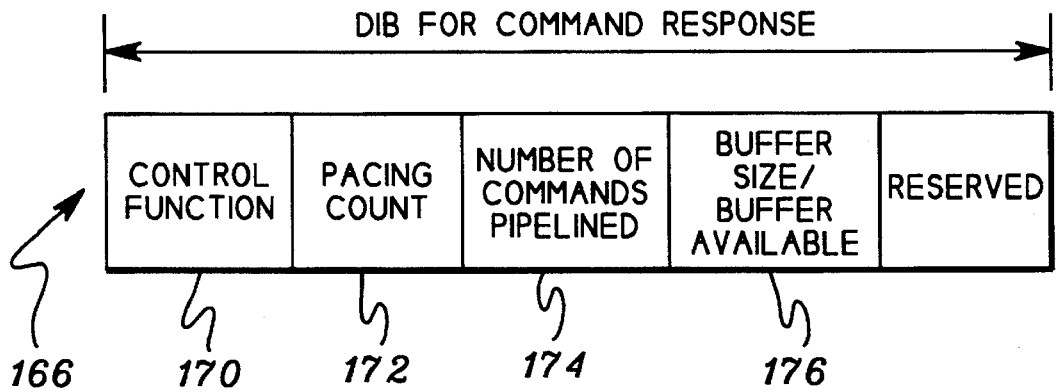
FIG. 6c illustrates one example of the fields associated with the device information block for the command response frame depicted in FIG. 6a, in accordance with the principles of the present invention.

Referring to FIG. 6b, device header 164 for command response frame 162 includes the following fields:

(a) Information Field Identifier 114: The fields associated with the information field identifier are illustrated in FIG. 5d and described previously. For a command response frame, address specific bit 122 (FIG. 5d) is set to one and supplemental status bit 124 is set to zero by the control unit. Supplemental status bit 124 is ignored by the channel.

(b) A Channel Command Word Number 168: In accordance with the principles of the present invention, channel command word number 168 is added to device header 164 of the command response frame. In one embodiment, channel command word number 168 is the same number that was received by the control unit in the command frame to which the command response frame relates.

(c) Device address 118: This field was described previously with regards to the command frame.

(d) Device Header Flag Field 120: The device header flags were also described previously with the command frame. However, in a command response frame, buffer available flag 136 can be active, but end early flag 138 and transfer count flag 140 are inactive.

In addition to the above, command response frame 162 further includes device information block 166. In accordance with the principles of the present invention, device information block 166 (FIG. 6c) for command response frame 162 includes the following fields:

(a) A Control Function Field 170: Control function 170 is interpreted in conjunction with the bits in device header flag field 120 to determine the device level function to be performed. This field is described in detail in International Business Machines "Enterprise Systems Architecture/390 ESCON I/O Interface," mentioned and incorporated by reference above.

In a command response frame, bits 5 through 7 of control function field 170 indicate the maximum device information block size to be sent in each data frame (described below) for the current input/output operation. If a value is specified in the device information block size field of the command response frame which exceeds the maximum device information block size specified by the channel when the logical path was established, a device level error is detected by the channel.

(b) A Pacing Count Field 172: Pacing count field 172 is, for example, eight bits in length and specifies the minimum number of pairs of idle characters to be used between successive data frames. The minimum number of pairs of idle characters that may be used between frames is two, which is represented by a count of 02 hex. The occurrence of fewer idle characters than the minimum specified by pacing count 172 may result in link-level or device-level errors being detected.

(c) Number of Commands Pipelined 174: In accordance with the principles of the present invention, this field has been added to command response frame 162. In one embodiment, this field is used in the first command response frame associated with a channel program; otherwise, it is reserved and set to zero. Number of commands pipelined 174 is used to indicate the number of commands that the control unit can accept from the channel at any given time before the control unit needs to respond to one or more commands.

(d) A Buffer size/Buffer Available Field 176: In accordance with the principles of the present invention, this field has also been added to command response frame 162. In the first command response frame sent by the control unit in a channel program, this field indicates to channel 34 the control unit's buffer size. Otherwise, if buffer available flag 136 is active, buffer size/buffer available field 176 is used as a buffer available count to indicate how much of the control unit's buffer is still available.

As described previously, in order to initiate an input/output operation, a command located in a channel command word is sent via a command frame from a channel to a control unit. Subsequently, the control unit receives the command and indicates to the channel via a command response frame that the command has been accepted. In accordance with the principles of the present invention, a number of commands associated with a corresponding number of channel command words in a channel program may be sent from the channel to the control unit without having received responses (such as, for example, a command response frame) from the control unit. One embodiment of pipelining the processing of channel command words is described in detail with reference to the logic flow diagram of a write operation depicted in FIG. 7.

Figure 7:
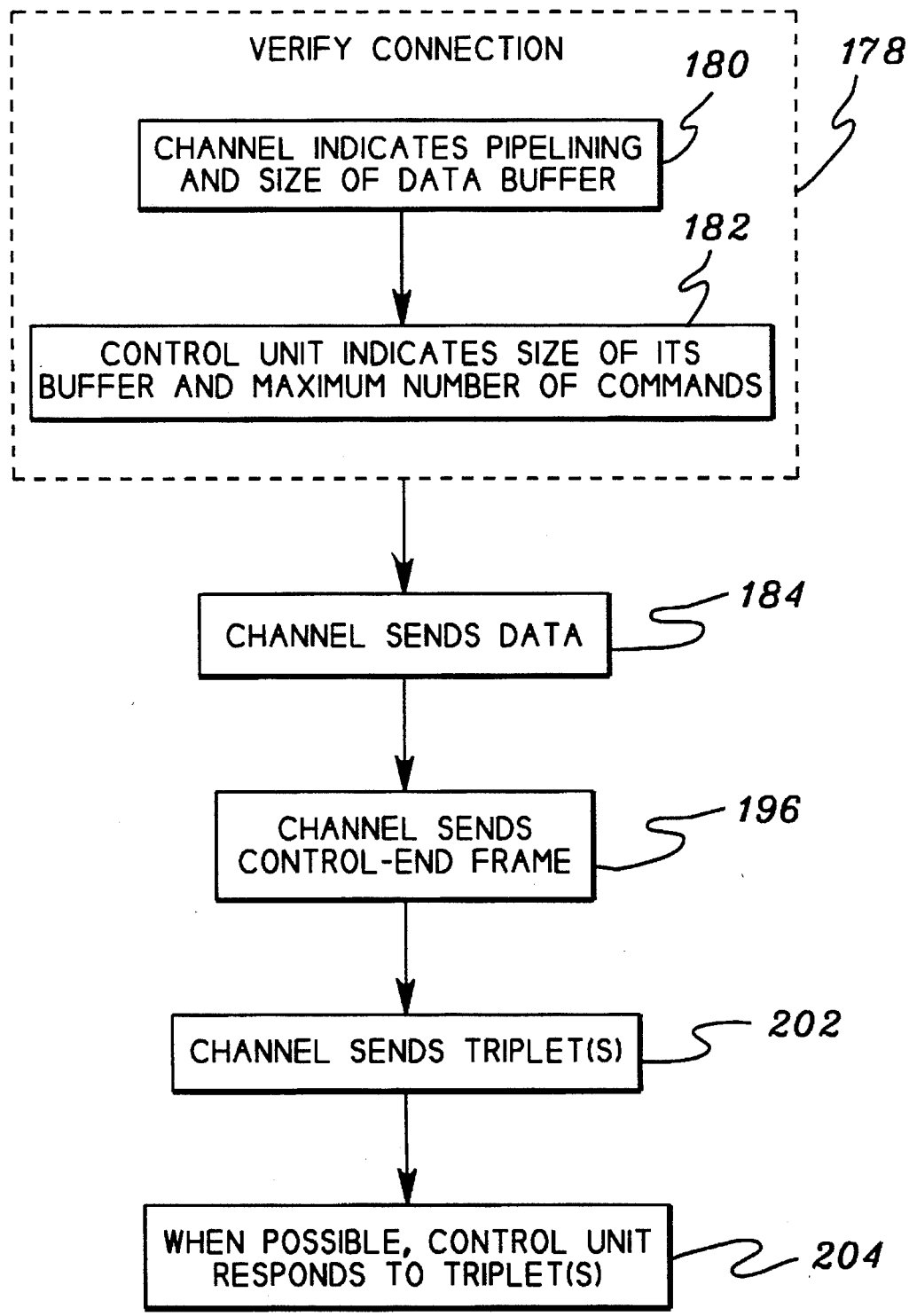
FIG. 7 illustrates one embodiment of a logic flow diagram of a method of pipelining write commands associated with channel command words in a channel program, in accordance with the principles of the present invention.

Referring to FIG. 7, in one embodiment, initially an exchange of information takes place between channel 34 and control unit 20 in order to verify a connection between the channel and the control unit, STEP 178 "Verify Connection." During the verification, channel 34 passes to control unit 20 via command frame 94 pipelining bit 154 and buffer size 116, STEP 180 "Channel Indicates Pipelining and Size of Data Buffer." Pipelining bit 154 is set to one when pipeline enable flag 64 located in operation request block 46 is one designating that pipelining of commands of the channel program is to occur, in accordance with the principles of the present invention. Buffer size 116 indicates to the control unit the buffer size of the channel in 256-byte blocks.

Subsequent to receiving this initial information, control unit 20 sends command response frame 162 to the channel which indicates an acceptance or rejection of the pipeline mode and indicates the size of the control unit's buffer and the maximum number of commands that it is willing to accept without responding to one of the commands, STEP 182 "Control Unit Indicates Size Of Its Buffer and Max Number of Commands." That is, if number of commands pipelined 174 of command response frame 162 is greater than one, then pipelining is accepted by the control unit and the value of number of commands pipelined 174 represents the maximum number of commands the control unit is willing to accept at any time before it responds to one of the commands. On the other hand, if the number of commands pipelined is, for instance, equal to one, then pipelining mode is rejected by the control unit. The size of the control unit's buffer is indicated by buffer size/buffer available field 176 in the command response frame. This value indicates to the channel the amount of data that can be sent to the control unit before receiving a buffer available frame, as described below, from the control unit on write operations.

Figure 8A:
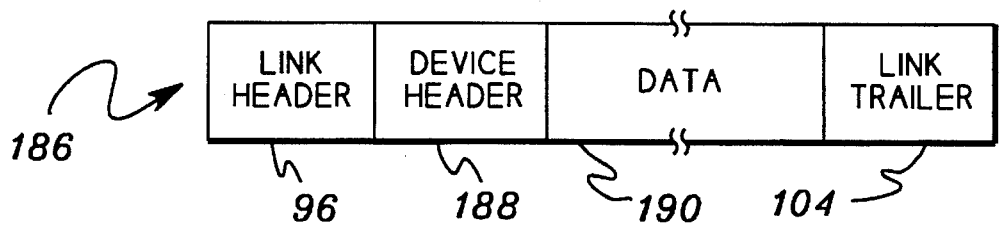
FIG. 8a depicts one example of the fields associated with a data frame, in accordance with the principles of the present invention.
Figure 8B:
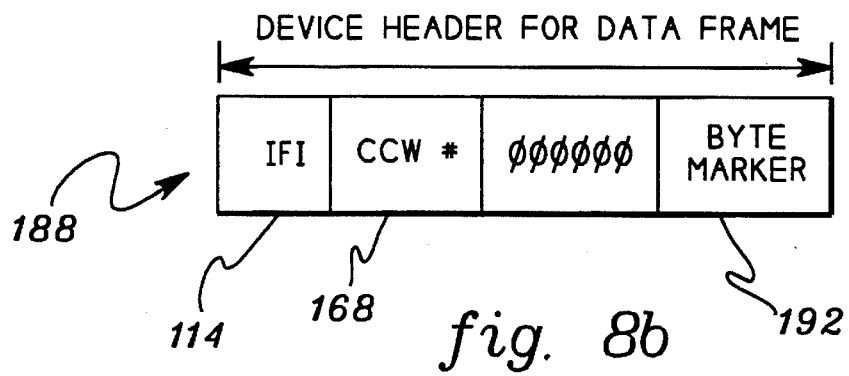
FIG. 8b illustrates one embodiment of the fields associated with the device header field of the data frame depicted in FIG. 8a, in accordance with the principles of the present invention.

Subsequent to the initial exchange of information, the channel proceeds to send any data it may have, STEP 184 "Channel Sends Data." Data is sent from the channel to the control unit via one or more data frames 186 (FIG. 8a). One example of data frame 186, in accordance with the principles of the present invention, is depicted in FIGS. 8a and 8b and described in detail herein.

Referring to FIG. 8a, data frame 186 includes link header 96, a device header 188, a data field 190 and link trailer 104. Link header 96 and link trailer 104 have been described previously. Referring to FIG. 8b, device header 188 includes information field identifier 114 indicating that this is a data frame; channel command word number 168 indicating which channel command word data frame 186 is associated with; and a byte marker 192, described below.

Information field identifier 114 has been described previously; however, for a data frame the following bits of the information field can have the values as described herein: For a data frame, address specific bit 122 is set to one; supplemental status bit 124 is set to zero; and device frame type 126 indicates a data frame (e.g., T2=0 and T1=0).

Byte marker 192 is used with a link which sends frames in multiples of four bytes, to mark the last three bytes of the data frame as data or pad characters (only the last data frame of a channel command word can have pad characters). Bits 6–7 of the byte marker are decoded as follows (the bits are in binary):

00—Only byte zero of the last word is valid.

01—Only bytes zero & one of the last word are valid.

10—Bytes zero—two of the last word are valid.

11—All four bytes of the last word are valid.

As previously stated, data frame 186 includes data field 190. In one embodiment, up to 4096 bytes of data may be included in the data frame.

In accordance with the principles of the present invention, subsequent to the channel writing the data to be written for a channel command word, the channel sends a control-end frame 194 to the control unit, STEP 196 (FIG. 7) "Channel Sends Control-End Frame." The control-end frame indicates the end of data transfer for data chaining and command chaining channel command words and may be sent even though the control unit has not sent any responses to the channel.

Figure 9A:
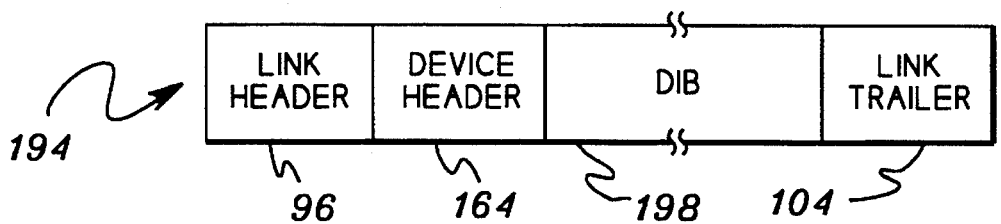
FIG. 9a illustrates one example of the fields associated with a control end frame, in accordance with the principles of the present invention.

Referring to FIG. 9a, control-end frame 194 includes link header 96, device header 164, a device information block 198 and link trailer 104. Once again, link header 96 and link trailer 104 have been previously described. Device header 164 has also been described previously and, therefore is not described in detail at this point. However, for a control-end frame sent by the channel, address specific bit 122 of information field identifier 114 is set to one; supplemental status bit 124 is set to zero; and device frame type 126 is control (e.g., T2=1 and T1=1). In addition to the above, the flags of device header flag field 120 of device header 164 have the following characteristics: End flag 128 is active when channel command word count 146 of command frame 94 is equal to a transfer count, described below; chaining flag 134 is active if a new command frame is to be sent to the control unit; buffer available flag 136 is inactive; end early flag 138 is used only by the channel; and transfer count valid flag 140 is active.

Figure 9B:
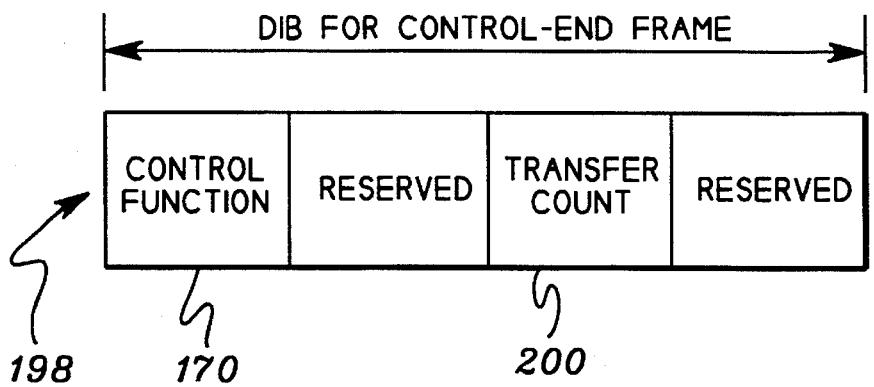
FIG. 9b depicts one example of the fields associated with the device information block of the control end frame depicted in FIG. 9a, in accordance with the principles of the present invention.

Referring to FIG. 9b, device information block 198 for control-end frame 194 includes control function 170, which indicates that this is a control-end frame and a transfer count 200 indicating the number of bytes of data that have been transferred for this command. The transfer count cannot be greater than channel command word count 146, but it can be smaller. For example, the transfer count can be smaller when the record size in a control unit is smaller than the channel command word count, or when the channel runs into storage exception cases and has to stop short. The control unit will continue processing in one example, if suppress length indication flag 82 is active in the current channel command word.

Referring again to FIG. 7, in one embodiment, subsequent to the channel sending control-end frame 194 to the control unit, the channel proceeds to send triplets consisting of the next command frame, the associated write data frames and a control-end frame until one or more predefined conditions are met. These conditions include reaching the limit of commands predefined by the control unit to be the maximum before a response is sent, or the limit of the control unit's data buffer, or reaching the end of the channel program, STEP 202 "Channel Sends Triplet(s)." In accordance with the principles of the present invention, the triplets can be sent to the control unit without waiting for any response from the control unit. That is, a number of commands of a corresponding number of channel command words in a channel program may be pipelined to the control unit without receiving, for example, a command response frame from the control unit. This advantageously enhances system throughput and performance.

It will be understood that to obtain the best performance, the control unit should send the command response to each received command as soon as possible, thus giving the channel permission to send yet another triplet. In this manner, the channel can continue sending triplets indefinitely without waiting for responses.

The control unit processes the commands in the order that it receives them from the channel. When the control unit is able, it sends a command response frame to the channel indicating that it has received and accepts the command, STEP 204 "When Possible Control Unit Responds to Triplet(s)."

In particular, the control unit responds to write commands and the data associated with the write commands received from the channel with command response frames and buffer available frames, described below. When the channel is sending data via a data frame to the control unit during a write operation, the channel can send an amount of data equal to the buffer size of the control unit, as indicated by buffer size/buffer available field 176 of command response frame 162. Thereafter, before additional data can be sent, the channel needs to receive from the control unit a buffer available frame, which indicates the amount of buffer space recently cleared. The transfer of data is managed independently of channel command word boundaries. As one example, if the control unit buffer size is 16K (as is known, K is equal to 1024) and the channel program consists of four write channel command words, each transferring 4K of data, the channel can send the 16K of data associated with the four channel command words before having received a response from the control unit. However, if for instance, 16K of data is associated with one channel command word, then before any additional data can be sent to the control unit from the channel, a buffer available frame would be sent indicating that the buffer has been cleared of a certain amount of data.

It will be understood that to achieve best performance, the control unit should send buffer available frames at frequent intervals, so that the channel can send data indefinitely without reaching the limit given in buffer size/buffer available field 176 of command response frame 162. For example, the control unit may specify a buffer size of 16K. The channel may send 4K of data in each frame. For best performance, the control unit should send a buffer available frame indicating 4K bytes as soon as possible after receiving each data frame. Thus, the channel is allowed to keep sending data indefinitely without having to wait for a buffer available frame.

Figure 10A:
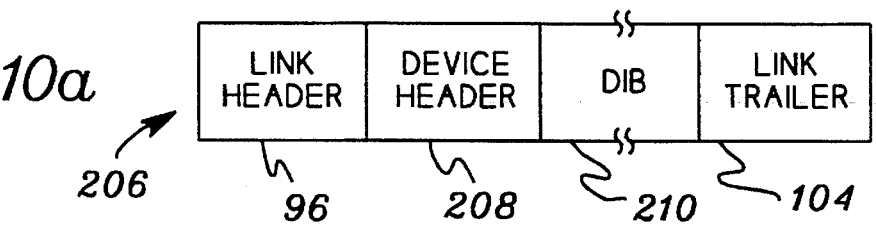
FIG. 10a illustrates one example of the fields associated with a buffer available frame, in accordance with the principles of the present invention.
Figure 10B:
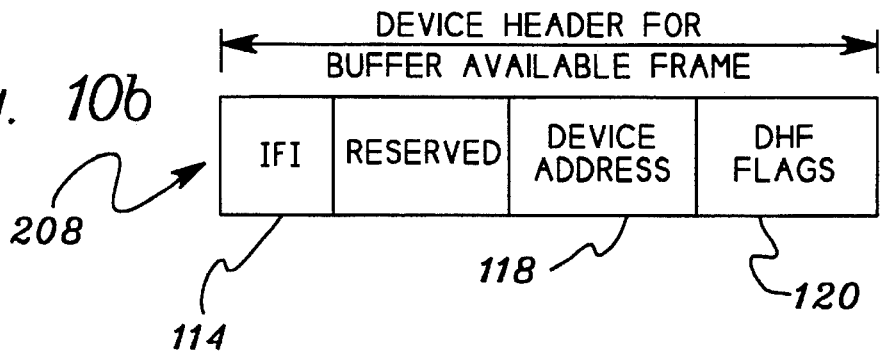
FIG. 10b depicts one example of the fields associated with the device header of the buffer available frame depicted in FIG. 10a, in accordance with the principles of the present invention.
Figure 10C:
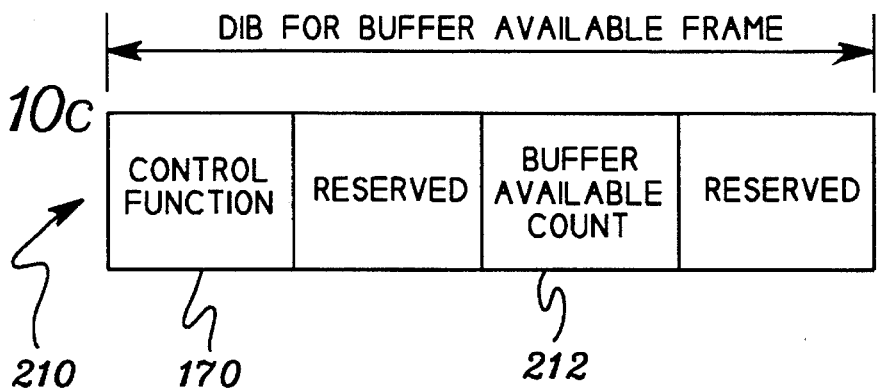
FIG. 10c depicts one example of the fields associated with the device information block of the buffer available frame depicted in FIG. 10a, in accordance with the principles of the present invention.

One embodiment of a buffer available frame 206, in accordance with the principles of the present invention, is depicted in FIGS. 10a–10c and described in detail herein.

Referring to FIG. 10a, buffer available frame 206 includes link header 96, a device header 208, a device information block 210 and a link trailer 104. Link header 96 and link trailer 104 are described in detail above. Device header 208 includes information field identifier 114 (FIG. 10b), device address 118 and device header flag field 120, also described above. For a buffer available frame sent by the control unit, address specific bit 122 of information field identifier 114 is set to one; supplemental status bit 124 is set to zero; and device frame type 126 is control (e.g., T2=1 and T1=1). In addition for buffer available frame 206, the following flags in device header flag field 120 are inactive: ready flag 132, chaining flag 134, end early flag 138 and transfer count valid flag 140; however, buffer available flag 136 is active.

Referring to FIG. 10c, device information block 210 of buffer available frame 206 includes control function 170, which indicates that this is a buffer available frame; and a buffer available count 212, which represents the number of bytes of data received and disposed of by the control unit in a write command situation.

Subsequent to the channel receiving buffer available frame 206, and in particular, an indication of the number of bytes of data that has been disposed of by the control unit, the channel sends more data until the buffer is full once again or there is no more data to send. The data being sent can be associated with one or more channel command words, as described above.

Figure 11A:
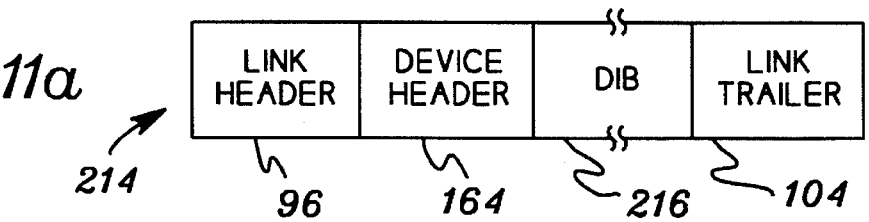
FIG. 11a illustrates one example of the fields associated with a status frame, in accordance with the principles of the present invention.

If during the pipelining of data or commands, the control unit wishes to end, disrupt or interrupt the pipelining operation (drain the pipeline) or if the channel program comes to an end (i.e, the control unit has sent a command response frame for each of the commands sent from the channel to the control unit), the control unit sends to the channel a status frame 214 (FIG. 11a).

Referring to FIG. 11a, in one embodiment, in accordance with the principles of the present invention, status frame 214 includes link header 96 and link trailer 104, which are described above, device header 164 and a device information block 216. For a status frame, the fields in information field identifier 114 of device header 164 have the following values: address specific bit 122 is set to a one; supplemental status bit 124 may be set to one representing that supplemental status is present in device information block 216 or it may be set to zero representing that there is no supplemental status in the device information block; and device frame type 126 is status (e.g., T2=1 and T1=0). In addition, for a status frame, buffer available flag 136, end early flag 138 and transfer count valid flag 140 of device header flag field 120 are inactive.

Figure 11B:
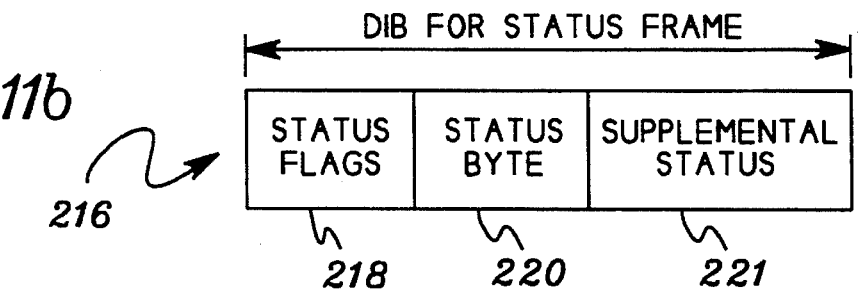
FIG. 11b depicts one example of the fields associated with the device information block of the status frame depicted in FIG. 11a, in accordance with the principle of the present invention.

Referring to FIG. 11b, device information block 216 includes a status flag field 218, a status byte field 220 and a supplemental status field 221. Status flag field 218 is used to provide additional information to the channel concerning the conditions that were present in the control unit when status was generated and conditions that pertain to the status frame, and status byte field 220 is used to indicate device and control unit status. The status byte field may indicate, for instance, that the device or the control unit is busy, there is a channel end or a device end, just as a few examples. In one example, status byte field 220 includes the following format:

| STATUS BIT POSITION | DESCRIPTION |
| --- | --- |
| 0 | Attention |
| 1 | Status modifier |
| 2 | Control-unit end |
| 3 | Busy |
| 4 | Channel end |
| 5 | Device end |
| 6 | Unit check |
| 7 | Unit exception |

Supplemental status field 221 provides additional information with certain status byte field values. For example, if the status byte indicates that an error occurred, the supplemental status field may provide additional information about the error.

When the channel receives a status frame, it returns a control frame acknowledging a final or disconnect status. If, however, the last frame from the channel before a pipeline drain had one of the chaining flags active and pipelining flag 154 is active, the control unit waits for an expected channel command word command frame from the channel or times out and goes through a recovery procedure.

Although the control unit may interrupt the pipelining operation of the present invention by sending a status frame to the channel, the channel can also interrupt the pipelining operation. Described herein are examples in which the channel can interrupt the pipelining after sending a command frame with pipelining bit 154 active, in accordance with the principles of the present invention.

It is possible to interrupt the pipelining operation and drain the pipeline by requesting synchronization. Two examples of requesting synchronization, in accordance with the principles of the present invention, are described below. Synchronization does not terminate the command chained operation and pipelining can be resumed after the channel receives status from the control unit. In one embodiment, synchronization is requested in command chained channel command words and thus, data chaining is not affected.

As one example, in order to request synchronization of the pipeline, a synchronization bit is added to the flag field of channel command word 72 (FIGS. 4a, 4b) (e.g., bit 39 (format-0) or bit 15 (format-1)). In one example, draining is requested at command chain points. In this example, the synchronization bit may be set to one in any channel command word which has command chain bit 80 set to one.

As another example, a synchronization bit is not added to the channel command word. Instead, a channel synchronization channel command word is used to specify that the pipeline is to be drained at that point in the channel program. In this example, a special channel command word, which may be called channel sync is defined to request synchronization of the pipeline. The channel sync channel command word may be placed directly before a channel command word which has command chain bit 80 set to one. The channel sync channel command word is similar in format to the format-1 channel command word 72 (depicted in FIG. 4b). For a sync channel command word, command code 74 has a value which indicates that synchronization is to take place and command chain bit 80 is set to one. Other fields in the channel sync channel command word are not used. When the channel processes the channel sync channel command word, it prepares to interrupt the pipelining operation after it processes the next channel command word. It should be understood that the channel sync channel command word itself does not cause the channel to send a command frame to the control unit.

On detection of the synchronized pipeline condition, by detecting the synchronization bit or synchronization channel command word, the channel takes the following action on a write or control command: after the data is transmitted to the control unit, a control-end frame is sent with chaining bit 134 inactive. The channel does not start processing any additional channel command words. The receipt of the control-end frame solicits status from the control unit after completion of the channel command words previously sent. After the receipt of status, the pipeline operation continues. In particular, the channel can respond to the status frame with a command frame if the status frame indicates chaining status and command chaining flag 150 was active in the last command frame sent by the channel. When the pipelining operation resumes, the next command contains a channel command word number one greater than the channel command word number for the last status received.

In addition to the above, on detection of the synchronized pipeline condition, by detecting the synchronization bit or synchronization channel command word, the channel takes the following action on a read (described below) or sense command (assuming chaining flag 134 is on): after the channel receives the data associated with the read command for which the pipeline operation is interrupted, the channel sends the control-end frame with end bit 128 and ready bit 132 on to solicit status from the control unit. Subsequent to receiving status, pipelining resumes. In particular, the channel can respond to the status frame with a command frame if the status frame indicates chaining status and command chaining flag 150 was active in the last command frame sent by the channel.

In another example, if the last frame sent by the channel indicated chaining and pipelining, the channel can send a control-end frame with end bit 128 and ready bit 132 active and transfer count valid flag 140 inactive. When the control unit receives and processes this frame sent by the channel, the control unit sends a status frame to the channel when appropriate. The channel can respond to this status frame with a command frame, if the status frame indicates chaining status and command chaining flag 150 was active in the last command frame sent by the channel.

Previously described is one example of the logic associated with a write command and the pipelining operation of the present invention. Following, is a description of the manner in which read commands are pipelined and the appropriate responses to read commands, in accordance with the principles of the present invention.

Figure 12:
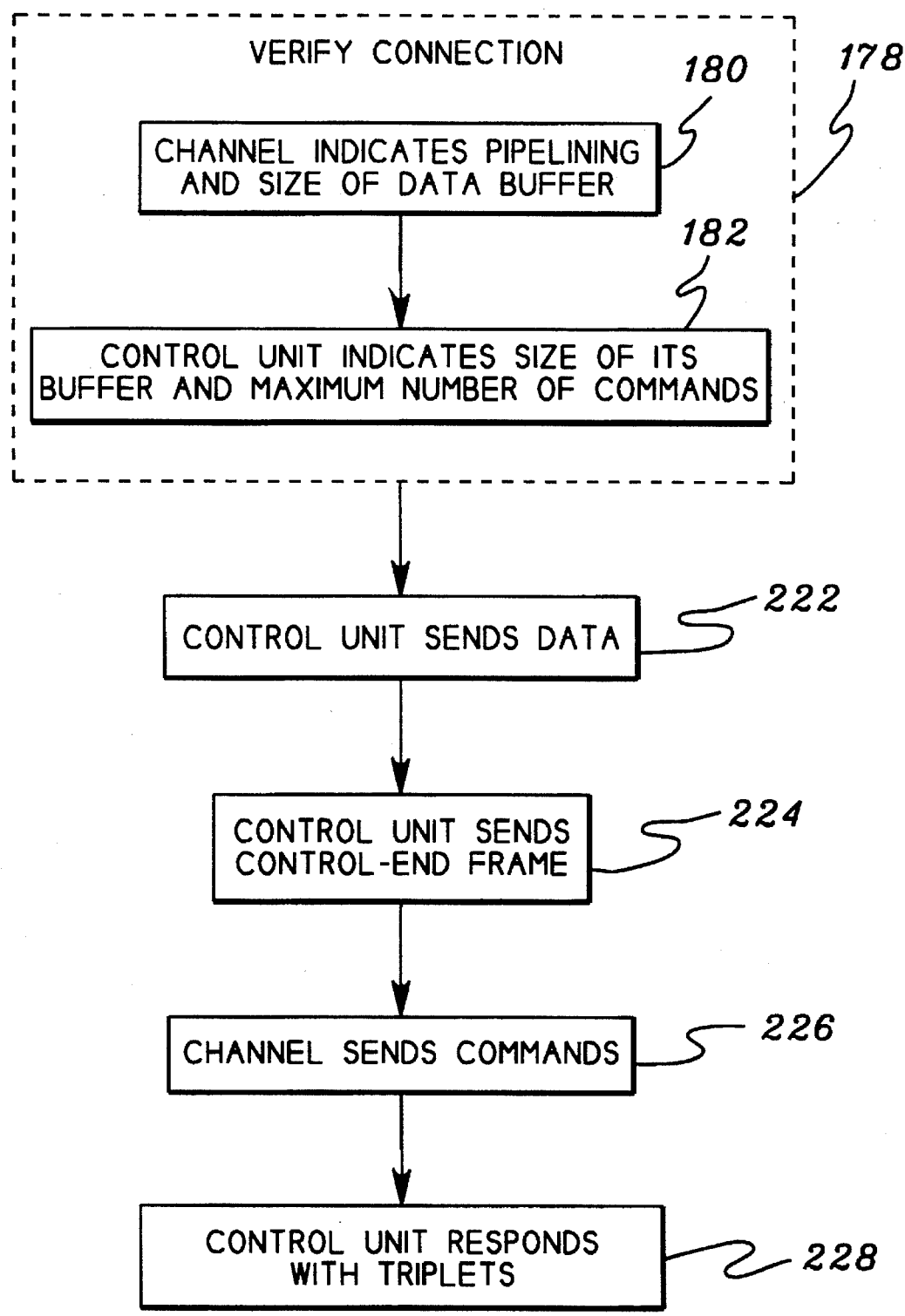
FIG. 12 illustrates one embodiment of a logic flow diagram of a method of pipelining read commands associated with channel command words in a channel program, in accordance with the principles of the present invention.

Referring to FIG. 12, a logic flow diagram of the pipelining operation associated with read commands is described in detail. Similar to the write operation, initially the connection between the channel and the control unit is verified, STEP 178 "Verify Connection" by sending a command frame from the channel to the control unit indicating pipelining is to occur and the size of the channel's data buffer, STEP 180 "Channel Indicates Pipelining and Size of Data Buffer" and by the control unit responding to the channel with an indication of the size of its buffer and the maximum number of commands it can accept before sending a response to one of the commands previously sent, STEP 182 "Control Unit Indicates Size of Its Buffer and Maximum Number of Commands."

Subsequent to verifying the connection, in one embodiment, the control unit sends any data it may have to the channel via data frames 186, STEP 222 "Control Unit Sends Data." As described above, the control unit can only send an amount of data up to the buffer size of the channel as specified by buffer size 116 of the command frame. Thereafter, in order to send more data, buffer available frame 206 needs to be sent from the channel to the control unit indicating that at least part of the buffer has been cleared and specifying the cleared amount. Buffer available frames are described above; however, for a buffer available frame sent by the channel, the fields in information field identifier 114 may have the following values: address specific bit 122 is set to a one; supplemental status bit 124 is set to zero and ignored by the channel; and device frame type 126 indicates a control frame.

It will be understood that to achieve best performance, the channel should send buffer available frames at frequent intervals, so that the control unit can send data indefinitely without reaching the limit given in CCW#/buffer size field 116 of device header 100 of the command frame. For example, the channel may specify a buffer size of 16K. The control unit may send 4K of data in each frame. For best performance, the channel should send a buffer available frame indicating 4K bytes as soon as possible after receiving each data frame. Thus, the control unit is allowed to keep sending data indefinitely without having to wait for a buffer available frame.

After sending the data associated with a particular channel command word, the control unit sends to the channel control-end frame 194 indicating that there is no more data for that particular channel command word, STEP 224 "Control Unit Sends Control-End Frame."

In one embodiment, subsequently the channel continues to send commands via command frames to the channel, STEP 226 "Channel Sends Command," up to the number specified by the control unit and the control unit responds to the read commands with triplets consisting of command response frame 162, data frames 186 and control-end frame 194, STEP 228 "Control Unit Responds With Triplets." (In another embodiment, it is possible to send a command from the channel to the control unit after the command response frame is sent to the channel and before the data frames associated with the previously sent command are transferred.)

The pipelining method of the present invention is illustrated in the following examples. These examples are only illustrative and other examples and embodiments are encompassed within the scope of the invention.

The first example includes a write command associated with one channel command word having 16K of data (▶-refers to transfers from the channel to the control unit and ◀-refers to transfers from the control unit to the channel). In each of the following examples, the abbreviations are defined as follows:

WRT refers to a write command;

RD refers to a read command;

BUF S refers to buffer size 90 of the relevant buffer;

CCW refers to the channel command word which the command is associated with;

ACT means an accept command response control frame. This frame is known in the art and thus, is not described in detail herein. A discussion of the frame is in Enterprise Systems Architecture/390 ESCON I/O Interface, which is mentioned above and incorporated by reference herein;

RDY refers to ready flag 132;

BA refers to buffer available count 136;

P refers to pipelining bit 154;

E refers to end flag 128;

XV refers to transfer count valid 140;

TRF CT refers to transfer count 200;

CE refers to the channel end bit in status byte 220, described in the ESA/390 ESCON I/O Interface;

DE refers to the device end bit in status byte 220, also described in the ESCON I/O Interface; CONTROL ACC refers to a message which acknowledges receipt of the status frame; and CONTROL ACK refers to a general purpose acknowledgement of frames. In one example, the control unit acknowledges to the channel that it received the CONTROL ACC frame.

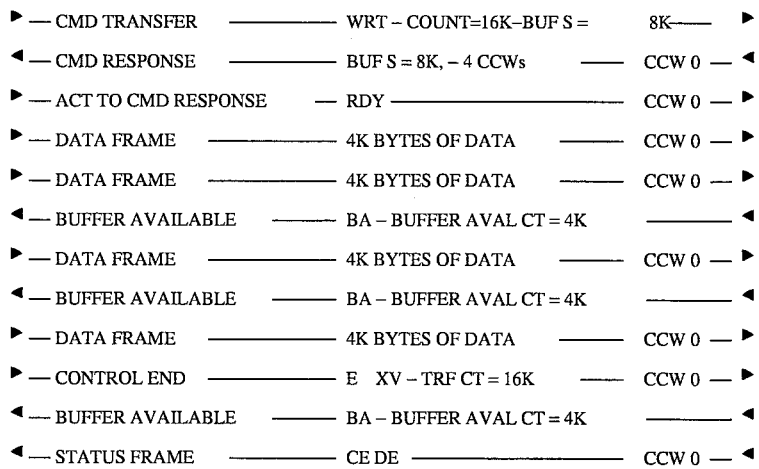

```
▶ — CMD TRANSFER          ———  WRT – COUNT=16K–BUF S =      8K———  ▶
◀ — CMD RESPONSE          ———  BUF S = 8K, – 4 CCWs         ———  CCW 0 — ◀
▶ — ACT TO CMD RESPONSE   — RDY ——————————————              ———  CCW 0 — ▶
▶ — DATA FRAME            ———  4K BYTES OF DATA             ———  CCW 0 — ▶
▶ — DATA FRAME            ———  4K BYTES OF DATA             ———  CCW 0 — ▶
◀ — BUFFER AVAILABLE      ———  BA – BUFFER AVAL CT = 4K     ————————  ◀
▶ — DATA FRAME            ———  4K BYTES OF DATA             ———  CCW 0 — ▶
◀ — BUFFER AVAILABLE      ———  BA – BUFFER AVAL CT = 4K     ————————  ◀
▶ — DATA FRAME            ———  4K BYTES OF DATA             ———  CCW 0 — ▶
▶ — CONTROL END           ———  E  XV – TRF CT = 16K         ———  CCW 0 — ▶
◀ — BUFFER AVAILABLE      ———  BA – BUFFER AVAL CT = 4K     ————————  ◀
◀ — STATUS FRAME          ———  CE DE ———————————————        ———  CCW 0 — ◀
```

| | -continued | | |
|---|---|---|---|
| ▶ — CONTROL ACC | | CCW 0 — ▶ | |
| ◀ — CONTROL ACK | | CCW 0 — ◀ | |

It will be understood that in the foregoing example, each buffer available frame is not precisely interlocked with the data frame preceding it. For example, the first buffer available frame may arrive at the channel at any time after the channel sends the first data frame and the second buffer available frame may arrive at any time after the channel sends the second data frame.

The following example depicts one read command of an associated channel command word with 16K of data:

words. In this example, command chaining flag 80 is active:

| | | | |
|---|---|---|---|
| ▶ — CMD TRANSFER | RD – COUNT=16K–BUF S = | 8K — ▶ | |
| ◀ — CMD RESPONSE | BUF S = 4K, – 4 CCWs | CCW 0 — ◀ | |
| ▶ — ACT TO CMD RESPONSE | — RDY | CCW 0 — ▶ | |
| ◀ — DATA FRAME | 4K BYTES OF DATA | CCW 0 — ◀ | |
| ▶ — BUFFER AVAILABLE | BA – BUFFER AVAL CT = 4K | ▶ | |
| ◀ — DATA FRAME | 4K BYTES OF DATA | CCW 0 — ◀ | |
| ▶ — BUFFER AVAILABLE | BA – BUFFER AVAL CT = 4K | ▶ | |
| ◀ — DATA FRAME | 4K BYTES OF DATA | CCW 0 — ◀ | |
| ▶ — BUFFER AVAILABLE | BA – BUFFER AVAL CT = 4K | ▶ | |
| ◀ — DATA FRAME | 4K BYTES OF DATA | CCW 0 — ◀ | |
| ◀ — CONTROL END | E  XV – TRF CT = 16K | CCW 0 — ◀ | |
| ◀ — STATUS FRAME | CE DE | CCW 0 — ◀ | |
| ▶ — CONTROL ACC | | CCW 0 — ▶ | |
| ◀ — CONTROL ACK | | CCW 0 — ◀ | |

The following example illustrates the pipelining of three write commands associated with three channel command

| | | | |
|---|---|---|---|
| ▶ — CMD TRANSFER | WRT–CC–P–COUNT=16–BUF S= | 4K — ▶ | |
| ◀ — CMD RESPONSE | BUF S = 4K, – 4 CCWs | CCW 0 — ◀ | |
| ▶ — ACT TO CMD RESPONSE | — RDY | CCW 0 — ▶ | |
| ▶ — DATA FRAME | 16 BYTES OF DATA | CCW 0 — ▶ | |
| ▶ — CONTROL END | E CH XV – TRF CT = 16 | CCW 0 — ▶ | |
| ▶ — CMD TRANSFER | CH–WRT– CC–P –COUNT=16– | CCW 1 — ▶ | |
| ▶ — DATA FRAMES | 16 BYTES OF DATA | CCW 1 — ▶ | |
| ▶ — CONTROL END | E CH XV – TRF CT = 16 | CCW 1 — ▶ | |
| ◀ — BUFFER AVAILABLE | BA  –  BUFFER AVAL CT  =  32 | ◀ | |
| ▶ — CMD TRANSFER | CH – WRT – COUNT = 4K | CCW 2 — ▶ | |
| ▶ — DATA FRAMES | 4K BYTES OF DATA | CCW 2 — ▶ | |
| ▶ — CONTROL END | E  XV – TRF CT = 4K | CCW 2 — ▶ | |
| ◀ — CMD RESPONSE | | CCW 1 — ◀ | |
| ◀ — CMD RESPONSE | | CCW 2 — ◀ | |
| ◀ — STATUS FRAME | CE DE | CCW 2 — ◀ | |
| ▶ — CONTROL ACC | | CCW 2 — ▶ | |

The following example illustrates one example of pipelining three channel command words, each including a read command. Command chaining flag 78 is active in the first two channel command words:

```
► — CMD TRANSFER      ———— RD–CC–P–COUNT=16–BUF S=     4K ————— ►
◄ — CMD RESPONSE      ———— BUF S = 4K, – 2 CCWs        ———— CCW 0 — ◄
► — ACT TO CMD RESPONSE  — RDY ——————————————————————— CCW 0 — ►
► — CMD TRANSFER      ———— CH–RD–CC–P–COUNT=4K         ———— CCW 1 — ►
◄ — DATA FRAME        ———— 16 BYTES OF DATA            ———— CCW 0 — ◄
◄ — CONTROL END       ———— E CH XV – TRF CT = 16       ———— CCW 0 — ◄
► — BUFFER AVAILABLE  ———— BA–BUFFER AVAL CT=16        ————————— ►
◄ — CMD RESPONSE      ———————————————————————————————— CCW 1 — ◄
► — CMD TRANSFER      ———— CH – RD – COUNT = 4K        ———— CCW 2 — ►
◄ — DATA FRAMES       ———— 4K BYTES OF DATA            ———— CCW 1 — ◄
◄ — CONTROL END       ———— E CH XV – TRF CT = 4K       ———— CCW 1 — ◄
► — BUFFER AVAILABLE  ———— BA–BUFFER AVAL CT =4K       ————————— ►
◄ — CMD RESPONSE      ———————————————————————————————— CCW 2 — ◄
◄ — DATA FRAMES       ———— 4K BYTES OF DATA            ———— CCW 2 — ◄
◄ — CONTROL END       ———— E    XV – TRF CT = 4K       ———— CCW 2 — ◄
◄ — STATUS FRAME      ———— CE DE ——————————————————————— CCW 2 — ◄
► — CONTROL ACC       ———————————————————————————————— CCW 2 — ►
◄ — CONTROL ACK       ———————————————————————————————— CCW 2 — ◄
```

It will be understood that following the first CMD RESPONSE in the foregoing example, the channel has permission to send two more commands. It may send the third CMD TRANSFER at any time after it sent the second CMD TRANSFER.

The following example illustrates one example of pipelining three channel command words. The first two channel command words each include a write command. Data chaining flag 78 active in the second channel command word:

```
► — CMD TRANSFER      ———— WRT–CC–P–COUNT=16–BUF S=     4K  ——— ►
◄ — CMD RESPONSE      ———— BUF S = 8K, – 4 CCWs         ———— CCW 0 — ◄
► — ACT TO CMD RESPONSE — RDY ——————————————————————— CCW 0 — ►
► — DATA FRAME        ———— 16 BYTES OF DATA             ———— CCW 0 — ►
► — CONTROL END       ———— E CH XV – TRF CT = 16        ———— CCW 0 — ►
► — CMD TRANSFER      ———— CH–WRT–CD–DU–P–COUNT=16–     —— CCW 1 — ►
► — DATA FRAMES       ———— 16 BYTES OF DATA             ———— CCW 1 — ►
► — CONTROL END       ———— E CH XV – TRF CT = 16        ———— CCW 1 — ►
► — CMD TRANSFER      ———— CH–WRT–DU–COUNT = 4K         ———— CCW 2 — ►
► — DATA FRAMES       ———— 4K BYTES OF DATA             ———— CCW 2 — ►
► — CONTROL END       ———— E    XV – TRF CT = 4K        ———— CCW 2 — ►
◄ — BUFFER AVAILABLE  ———— BA – BUFFER AVAL CT = 16     ————————— ◄
◄ — CMD RESPONSE      ———————————————————————————————— CCW 1 — ◄
◄ — BUFFER AVAILABLE  ———— BA – BUFFER AVAL CT = 16     ————————— ◄
◄ — CMD RESPONSE      ———————————————————————————————— CCW 2 — ◄
```

◄ — STATUS FRAME  ———— CE DE ———————————————————— CCW 2 — ◄
► — CONTROL ACC  ————————————————————————————— CCW 2 — ►
◄ — CONTROL ACK  ————————————————————————————— CCW 2 — ◄

The following example illustrates one example of pipelining three channel command words. The first two channel command words each include a read command. Data chaining flag 78 active in the second channel command word: command words. After sending the third CMD TRANSFER, the channel has sent the maximum permitted number of commands without receiving a response. When the channel receives the CMD RESPONSE for CCW 1, it then sends the ► — CMD TRANSFER ———— RD–CC–P–COUNT=16–BUF S = 4K ———— ►
◄ — CMD RESPONSE ———— BUF S = 8K, – 4 CCWs ———————— CCW 0 — ◄
► — ACT TO CMD RESPONSE — RDY ———————————————— CCW 0 — ►
► — CMD TRANSFER ———— CH–RD–CD–DU–P–COUNT=4K ———— CCW 1 — ►
◄ — DATA FRAME ———— 16 BYTES OF DATA ———————— CCW 0 — ◄
◄ — CONTROL END ———— E CH XV – TRF CT = 16 ———————— CCW 0 — ◄
► — BUFFER AVAILABLE ———— BA – BUFFER AVAL CT = 16 ———— ►
◄ — CMD RESPONSE ———————————————————————— CCW 1 — ◄
► — CMD TRANSFER ———— CH–RD–DU–COUNT = 4K ———————— CCW 2 — ►
◄ — DATA FRAMES ———— 4K BYTES OF DATA ———————— CCW 1 — ◄
◄ — CONTROL END ———— E CH XV – TRF CT = 4K ———————— CCW 1 — ◄
► — BUFFER AVAILABLE ———— BA–BUFFER AVAL CT = 4K ———— ►
◄ — CMD RESPONSE ———————————————————————— CCW 2 — ◄
◄ — DATA FRAMES ———— 4K BYTES OF DATA ———————— CCW 2 — ◄
◄ — CONTROL END ———— E   XV – TRF CT = 4K ———————— CCW 2 — ◄
◄ — STATUS FRAME ———— CE DE ———————————————— CCW 2 — ◄
► — CONTROL ACC ———————————————————————— CCW 2 — ►
◄ — CONTROL ACK ———————————————————————— CCW 2 — ◄

The following example illustrates one example of pipelining four read channel command words. In this example, command chaining flag 80 is active in the first three channel command words. fourth CMD TRANSFER.

► — CMD TRANSFER ———— RD–CC–P–COUNT=16K–BUF S= 4K ———— ►
◄ — CMD RESPONSE ———— BUF S = 4K, – 2 CCWs ———————— CCW 0 — ◄
► — ACT TO CMD RESPONSE — RDY ———————————————— CCW 0 — ►
► — CMD TRANSFER ———— CH–RD–CC–P–COUNT=2K ———— CCW 1 — ►
► — CMD TRANSFER ———— CH–RD–CC–P–COUNT=4K ———— CCW 2 — ►
◄ — DATA FRAME ———— 16 BYTES OF DATA ———————— CCW 0 — ◄
◄ — CONTROL END ———— E CH XV – TRF CT = 16 ———————— CCW 0 — ◄
► — BUFFER AVAILABLE ———— BA–BUFFER AVAL CT=16 ———————— ►
◄ — CMD RESPONSE ———————————————————————— CCW 1 — ◄
► — CMD TRANSFER ———— CH – RD – COUNT = 3K ———————— CCW 3 — ►
◄ — DATA FRAMES ———— 2K BYTES OF DATA ———————— CCW 1 — ◄
◄ — CONTROL END ———— E CH XV – TRF CT = 2K ———————— CCW 1 — ◄
► — BUFFER AVAILABLE ———— BA–BUFFER AVAL CT=2K ———————— ►

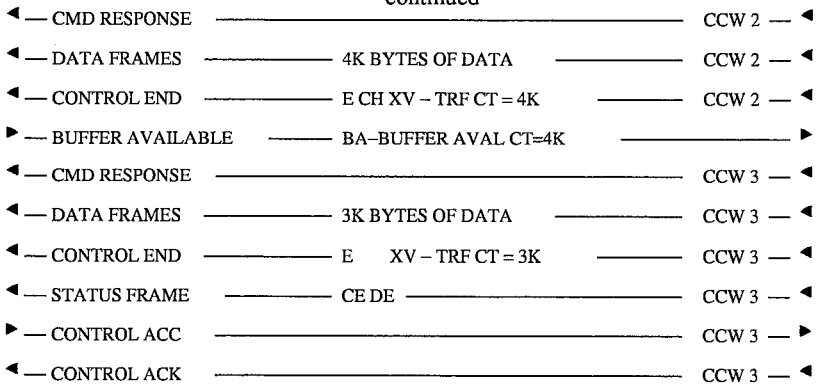

Described in detail herein is a method and system for pipelining the processing of channel command words of a channel program. As described in detail, in accordance with the principles of the present invention, a number of commands associated with a corresponding number of channel command words may be sent from the channel to the control unit without waiting for a response from the control unit to any of the commands. This advantageously reduces the amount of interlocks between the channel and the control unit and enhances system throughput and performance.

Although a preferred embodiment has been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for pipelining the processing of a plurality of channel command words in a channel program executing in a data processing system, said data processing system comprising a channel coupled to a control unit, said method comprising the steps of:

verifying a connection between said channel and said control unit, said verifying step including determining whether pipelining is to occur;

sending a plurality of commands from said channel to said control unit when pipelining is to occur, each of said plurality of commands being capable of being sent prior to said channel receiving a response to any one of said plurality of commands; and sending a response from said control unit to said channel for each of said plurality of commands received by said control unit.

2. The method of claim 1, wherein said verifying step comprises the steps of:

sending an initial command from said channel to said control unit, said initial command being retrieved from an initial channel command word; and sending an initial response frame from said control unit to said channel, said initial response frame corresponding to said initial channel command word.

3. The method of claim 2, further comprising the step of sending an accept command response frame from said channel to said control unit.

4. The method of claim 2, further comprising the step of transferring data associated with said initial channel command word from said channel to said control unit when said initial command specifies a write operation.

5. The method of claim 4, further comprising the step of sending a control end frame from said channel to said control unit when said data is transferred.

6. The method of claim 2, further comprising the step of transferring data associated with said initial channel command word from said control unit to said channel when said initial command specifies a read operation.

7. The method of claim 6, further comprising the step of sending a control end frame from said control unit to said channel when said data is transferred.

8. The method of claim 2, wherein said initial response frame further comprises a command count, said count specifying to said channel a maximum number of commands said control unit is capable of receiving prior to sending a response to any one of said commands, and wherein said plurality sending step comprises the step of sending said maximum number of commands from said channel to said control unit.

9. The method of claim 8, further comprising the step of sending a response from said control unit to said channel for at least one of said maximum number of commands.

10. The method of claim 9, further comprising the step of sending an additional command from said channel to said control unit when said response sent by said control unit is received by said channel.

11. The method of claim 2, wherein said initial response frame further comprises a channel command word number, said channel command word number corresponding to said initial channel command word.

12. The method of claim 2, wherein said plurality sending step further comprises the step of determining for each of said plurality of commands an input/output operation being specified by said command.

13. The method of claim 12, wherein said input/output operation includes one of a write operation and a read operation.

14. The method of claim 13, wherein said command specifies a write operation and said plurality sending step further includes the step of transferring data associated with said command from said channel to said control unit until a predefined condition is satisfied.

15. The method of claim 14, wherein said predefined condition comprises having completed said transferring of said data associated with said command, and wherein said plurality sending step further comprises the step of sending a control end frame from said channel to said control unit when said data for said command is transferred.

16. The method of claim 15, wherein said control end frame comprises a channel command word number, said channel command word number indicating to said control unit which one of said plurality of commands corresponds to said data.

17. The method of claim 14, wherein said initial response frame comprises a control unit buffer size indicator, said indicator specifying an amount of data capable of being stored in a buffer associated with said control unit.

18. The method of claim 17, wherein said predefined condition comprises having additional data associated with said command to send to said control unit and further having an amount of data in said control unit buffer equal to an amount specified by said control unit buffer size indicator, and wherein said plurality sending step further comprises the steps of:
   (a) said channel receiving from said control unit a control unit buffer available frame, said buffer available frame indicating to said channel that said control unit buffer has available space to receive at least a portion of said additional data; and
   (b) sending an amount of said additional data from said channel to said control unit when said control unit buffer available frame is received by said channel, said amount being specified by said control unit buffer available frame.

19. The method of claim 18, further comprising the steps of repeating steps (a) and (b) until all of said additional data is sent.

20. The method of claim 13, wherein said command specifies a read operation and said response sending step comprises the step of transferring data associated with said command from said control unit to said channel until a predefined condition is satisfied.

21. The method of claim 20, wherein said predefined condition comprises having completed said transferring of said data associated with said command, and wherein said response sending step further comprises the step of sending a control end frame from said control unit to said channel when said data is transferred.

22. The method of claim 21, wherein said control end frame comprises a channel command word number, said channel command word number indicating to said channel which one of said plurality of commands corresponds to said data.

23. The method of claim 20, wherein said initial command sending step further comprises the step of sending said initial command to said control unit using a command frame, said command frame including a pipeline indicator for determining whether pipelining is to occur.

24. The method of claim 23, wherein said command frame further comprises a channel buffer size indicator, said indicator specifying an amount of data capable of being stored in a buffer associated with said channel.

25. The method of claim 24, wherein said predefined condition comprises having additional data associated with said command to send to said channel and having an amount of data in said channel buffer equal to an amount specified by said channel buffer size indicator, and wherein said response sending step further comprises the steps of:
   (a) said control unit receiving from said channel a channel buffer available frame, said buffer available frame indicating said channel buffer has available space to receive at least a portion of said additional data; and
   (b) sending an amount of said additional data from said control unit to said channel when said channel buffer available frame is received by said control unit, said amount being specified by said channel buffer available frame.

26. The method of claim 25, further comprising the steps of repeating steps (a) and (b) until all of said additional data is sent.

27. The method of claim 1, further comprising the step of sending a status frame from said control unit to said channel when said response for each of said plurality of commands is received by said channel.

28. The method of claim 1, further comprising the Step of interrupting said pipelining.

29. The method of claim 28, wherein said interrupting step includes the step of sending from said control unit to said channel a status frame.

30. The method of claim 29, wherein said status frame comprises a channel command word number, said channel command word number indicating to said channel which one of said plurality of commands is associated with said status frame.

31. The method of claim 28, wherein said interrupting step comprises the step of sending a control end frame from said channel to said control unit, said control end frame including a chaining indicator, said indicator being inactive.

32. The method of claim 31, wherein said control end frame further comprises an end early indicator, said end early indicator specifying to said control unit that a portion of information associated with one of said commands has not been sent to said control unit.

33. The method of claim 28, wherein said interrupting step comprises the step of sending a control end frame from said channel to said control unit, said control end frame including an end indicator, a ready indicator and a transfer count valid indicator, said end indicator and said ready indicator being set active and said transfer count valid indicator being set inactive.

34. The method of claim 1, wherein said response sending step comprises the step of sending a response frame from said control unit to said channel.

35. The method of claim 34, wherein said response frame comprises a channel command word number, said channel command word number indicating to said channel which of one said plurality of commands has been received by said control unit.

36. A method for pipelining the processing of a plurality of channel command words in a channel program executing in a data processing system, said data processing system comprising a channel coupled to a control unit, said method comprising the steps of:

sending a first command from said channel to said control unit, said first command being retrieved from a first channel command word; and sending a second command from said channel to said control unit, said second command being retrieved from a second channel command word and said second command being sent to said control unit prior to said channel receiving a response from said control unit to said first command.

37. The method of claim 36, further comprising the step of sending any data associated with said first command and said second command from said channel to said control unit, said data being sent prior to said channel receiving a response from said control unit to said first command.

38. The method of claim 37, wherein said data is transferred until one of a plurality of conditions exists, said plurality of conditions comprising said data transfer is complete and a buffer associated with said control unit is incapable of receiving any more data until at least a portion of said buffer is cleared.

39. A system for pipelining the processing of a plurality of channel command words in a channel program executing in a data processing system, said data processing system comprising a channel coupled to a control unit, said system comprising:

means for sending a first command from said channel to said control unit, said first command being retrieved from a first channel command word; and means for sending a second command from said channel to said control unit, said second command being retrieved from a second channel command word and said second command being sent to said control unit prior to said channel receiving a response from said control unit to said first command.

40. The system of claim 39, further comprising means for transferring any data associated with said first command and said second command from said channel to said control unit, said data being transferred prior to said channel receiving said response from said control unit to said first command.

41. The system of claim 40, wherein said control unit comprises a buffer and said means for transferring data comprises means for transferring said data until one of a plurality of conditions exists, said plurality of conditions comprising said data transfer is complete and said buffer is incapable of receiving any more data until at least a portion of said buffer is cleared.

42. A system for pipelining the processing of a plurality of channel command words in a channel program executing in a data processing system, said data processing system comprising a channel coupled to a control unit, said system comprising:

means for verifying a connection between said channel and said control unit, said verifying means including means for determining whether pipelining is to occur;

means for sending a plurality of commands from said channel to said control unit when pipelining is to occur, each of said plurality of commands being capable of being sent prior to said channel receiving a response to any one of said plurality of commands; and means for sending a response from said control unit to said channel for each of said plurality of commands received by said control unit.

43. The system of claim 42, wherein said verifying means comprises:

means for sending an initial command from said channel to said control unit, said initial command being retrieved from an initial channel command word;

an initial response frame, said initial response frame corresponding to said initial channel command word; and means for sending said initial response frame from said control unit to said channel.

44. The system of claim 43, further comprising means for sending an accept command response frame from said channel to said control unit.

45. The system of claim 43, further comprising means for transferring data associated with said initial channel command word from said channel to said control unit when said initial command specifies a write operation.

46. The system of claim 45, further comprising:

a control end frame; and means for sending said control end frame from said channel to said control unit when said data is transferred.

47. The system of claim 43, further comprising means for transferring data associated with said initial channel command word from said control unit to said channel when said initial command specifies a read operation.

48. The system of claim 47, further comprising:

means for sending a control end frame; and said control end frame from said control unit to said channel when said data is transferred.

49. The system of claim 43, wherein said initial response frame further comprises a command count, said count specifying to said channel a maximum number of commands said control unit is capable of receiving prior to sending a response to any one of said commands, and wherein said plurality means comprises means for sending said maximum number of commands from said channel to said control unit.

50. The system of claim 49, further comprising means for sending a response from said control unit to send channel for at least one of said maximum number of commands.

51. The system of claim 50, further comprising means for sending an additional command from said channel to said control unit when said response sent by said control unit is received by said channel.

52. The system of claim 43, wherein said initial response frame further comprises a channel command word number, said channel command word number corresponding to said initial channel command word.

53. The system of claim 43, wherein said plurality sending means further comprises means for determining for each of said plurality of commands an input/output operation being specified by said command.

54. The system of claim 53, wherein said input/output operation includes one of a write operation and a read operation.

55. The system of claim 54, wherein said command specifies a write operation and said plurality sending means comprises means for transferring data associated with said command from said channel to said control unit until a predefined condition is satisfied.

56. The system of claim 55, wherein said predefined condition comprises having completed said transferring of said data associated with said command, and wherein said plurality sending means further comprises means for sending a control end frame from said channel to said control unit when said data for said command is transferred.

57. The system of claim 56, wherein said control end frame comprises a channel command word number, said channel command word number indicating to said control unit which one of said plurality of commands corresponds to said data.

58. The system of claim 55, wherein said initial response frame comprises a control unit buffer size indicator, said indicator specifying an amount of data capable of being stored in a buffer associated with said control unit.

59. The system of claim 58, wherein said predefined condition comprises having additional data associated with said command to send to said control unit and further having an amount of data equal to said control unit buffer size indicator in said control unit buffer, and wherein said plurality sending means further comprises:

a control unit buffer available frame, said control unit buffer available frame indicating to said channel that said control unit buffer has available space to receive at least a portion of said additional data;

means for sending to said channel from said control unit said control unit buffer available frame;

means for receiving from said control unit said control unit buffer available frame; and means for sending an amount of said additional data from said channel to said control unit when said control unit buffer available frame is received by said channel, said amount being specified by said control unit buffer available frame.

60. The system of claim 54, wherein said command specifies a read operation and said response sending means comprises means for transferring data associated with said command from said control unit to said channel until a predefined condition is satisfied.

61. The system of claim 60, wherein said predefined condition comprises having completed said transferring of said data associated with said command, and wherein said response sending means further comprises means for sending a control end frame from said control unit to said channel when said data is transferred.

62. The system of claim 61, wherein said control end frame comprises a channel command word number, said channel command word number indicating to said channel which one of said plurality of commands corresponds to said data.

63. The system of claim 60, wherein said initial command sending means further comprises means for sending said initial command to said control unit using a command frame, said command frame including a pipeline indicator for determining whether pipelining is to occur.

64. The system of claim 63, wherein said command frame further comprises a channel buffer size indicator, said indicator specifying an amount of data capable of being stored in a buffer associated with said channel.

65. The system of claim 64, wherein said predefined condition comprises having additional data associated with said command to send to said channel and having an amount of data in said channel buffer equal to an amount specified by said channel buffer size indicator, and wherein said response sending means further comprises:

a channel buffer available frame, said channel buffer available frame indicating said channel buffer has available space to receive said additional data;

means for sending said channel buffer available frame from said channel to said control unit;

means for receiving from said channel said channel buffer available frame; and means for sending said additional data from said control unit to said channel when said channel buffer available frame is received by said control unit.

66. The system of claim 42, further comprising means for sending a status frame from said control unit to said channel when said response for each of said plurality of commands is received by said channel.

67. The system of claim 42, further comprising means for interrupting said pipelining.

68. The system of claim 67, wherein said interrupting means comprises:

a status frame; and means for sending said status frame from said control unit to said channel.

69. The system of claim 68, wherein said status frame comprises a channel command word number, said channel command word number indicating to said channel which one of said plurality of commands is associated with said status frame.

70. The system of claim 67, wherein said interrupting means comprises:

a control end frame, said control end frame including a chaining indicator, said indicator being inactive; and means for sending said control end frame from said channel to said control unit.

71. The system of claim 70, wherein said control end frame further comprises an end early indicator, said end early indicator specifying to said control unit that information associated with one of said commands has not been sent to said control unit.

72. The system of claim 67, wherein said interrupting means comprises:

a control end frame, said control end frame including an end indicator, a ready indicator and a transfer count valid indicator, said end indicator and said ready indicator being set active and said transfer count valid indicator being set inactive; and means for sending said control end frame from said channel to said control unit.

73. The system of claim 42, wherein said response sending means comprises means for sending a response frame from said control unit to said channel.

74. The system of claim 73, wherein said response frame comprises a channel command word number, said channel command word number indicating to said channel which of one said plurality of commands has been received by said control unit.

75. A method for pipelining the processing of a plurality of channel command words in a channel program executing in a data processing system, said data processing system comprising a channel coupled to a control unit, said method comprising the steps of:

sending a plurality of commands from said channel to said control unit; and sending a response from said control unit to said channel for each of said plurality of commands received by said control unit, wherein one or more of said responses is sent prior to said control unit receiving a number of commands equal to a command count, thereby allowing commands to be sent from said channel to said control unit while responses are sent from said control unit to said channel without an interruption in processing.

76. The method of claim 75, further comprising the steps of:

transferring data from said channel to said control unit during a write operation specified by one of said plurality of commands; and during said transferring step, sending one or more buffer available frames from said control unit to said channel, thereby allowing data to be sent from said channel to said control unit while buffer available frames are sent from said control unit to said channel without an interruption in processing.

77. The method of claim 75, further comprising the steps of:

transferring data from said control unit to said channel during a read operation specified by one of said plurality of commands; and during said transferring step, sending one or more buffer available frames from said channel to said control unit, thereby allowing data to be sent from said control unit to said channel while buffer available frames are sent from said channel to said control unit without an interruption in processing.

78. A system for pipelining the processing of a plurality of channel command words in a channel program executing in a data processing system, said data processing system comprising a channel coupled to a control unit, said system comprising:

means for sending a plurality of commands from said channel to said control unit; and means for sending a response from said control unit to said channel for each of said plurality of commands received by said control unit, wherein one or more of said responses is sent prior to said control unit receiving a number of commands equal to a command count, thereby allowing commands to be sent from said channel to said control unit while responses are sent from said control unit to said channel without an interruption in processing.

79. The system of claim 78, further comprising:

means for transferring data from said channel to said control unit during a write operation specified by one of said plurality of commands; and means for sending one or more buffer available frames during said transferring step from said control unit to said channel, thereby allowing data to be sent from said channel to said control unit while buffer available frames are sent from said control unit to said channel without an interruption in processing.

80. The system of claim 78, further comprising:

means for transferring data from said control unit to said channel during a read operation specified by one of said plurality of commands; and means for sending one or more buffer available frames during said transferring step from said channel to said control unit, thereby allowing data to be sent from said control unit to said channel while buffer available frames are sent from said channel to said control unit without an interruption in processing.

* * * * *